US012798430B2

(12) United States Patent
(10) Patent No.: US 12,798,430 B2
(45) Date of Patent: Nov. 17, 2026

Triplet et al.

(54) SYSTEMS AND METHODS FOR PROVIDING CONTROL IN RELATION TO ELECTRIC VEHICLES BASED ON ENVIRONMENTAL EMISSIONS FROM POWER GENERATION SOURCES

(71) Applicant: BluWave Inc., Ottawa (CA)

(72) Inventors: Thomas Triplet, Ottawa (CA); Richard Waterhouse, Ottawa (CA); Alexander Linchieh, Ottawa (CA); Craig Downing, Ottawa (CA); Devashish Paul, Ottawa (CA); Illia Kruhlenko, Ottawa (CA); Danish Sajwani, Ottawa (CA)

(73) Assignee: BluWave Inc., Ottawa (CA)

( * ) Notice: Subject to any disclaimer, the term of this patent is extended or adjusted under 35 U.S.C. 154(b) by 211 days.

(21) Appl. No.: 18/922,624

(22) Filed: Oct. 22, 2024

(65) Prior Publication Data

US 2025/0135940 A1 May 1, 2025

Related U.S. Application Data

(60) Provisional application No. 63/593,560, filed on Oct. 27, 2023.

(51) Int. Cl.
*B60L 53/67* (2019.01)
*B60L 53/50* (2019.01)
(Continued)

(52) U.S. Cl.
CPC ............... *B60L 53/67* (2019.02); *B60L 53/50* (2019.02); *B60L 53/63* (2019.02); *B60L 53/68* (2019.02); *H02J 3/004* (2020.01); *H02J 2103/30* (2026.01)

(58) Field of Classification Search
CPC ............ B60L 2240/62; B60L 2240/70; B60L 2260/54; B60L 2270/10; B60L 53/50;
(Continued)

(56) References Cited

U.S. PATENT DOCUMENTS 9,519,522 B1 * 12/2016 Phadke ................ G06F 3/0631
2020/0023747 A1 1/2020 Logvinov et al.
(Continued)

OTHER PUBLICATIONS

European Patent Application No. 24208036.4, Extended European Search Report dated Mar. 31, 2025.

*Primary Examiner* — Omer S Khan
(74) *Attorney, Agent, or Firm* — BORDEN LADNER GERVAIS LLP

(57) ABSTRACT

Systems and methods relating to generating metrics and providing control in relation to electric vehicles (EVs) are provided. The metrics and control may be based on information relating to environmental emissions generated by power generation sources that provide power that is used to charge the EVs. The method may generate an overall score for a time interval based on the power grid information and the environmental emissions information, wherein the overall score indicates a level of suitability for charging an EV during the time interval, wherein higher suitability is associated with a lower quantity of environmental emissions. The generating control information may be based on the overall score, wherein the control information comprises EV charging schedule information.

20 Claims, 8 Drawing Sheets

(51) Int. Cl.

| | |
|---|---|
| ***B60L 53/63*** | (2019.01) |
| ***B60L 53/68*** | (2019.01) |
| ***H02J 3/00*** | (2026.01) |
| ***H02J 103/30*** | (2026.01) |

(58) Field of Classification Search

CPC .......... B60L 53/63; B60L 53/67; B60L 53/68; G06Q 10/063; G06Q 30/0206; G06Q 30/0283; G06Q 50/06; G06Q 50/40; H02J 2103/30; H02J 3/003; H02J 3/004; H02J 3/322; H02J 7/92

See application file for complete search history.

(56) References Cited

U.S. PATENT DOCUMENTS

| | | | | |
|---|---|---|---|---|
| 2022/0144121 | A1 | 5/2022 | Grunkemeyer et al. | |
| 2022/0410750 | A1 | 12/2022 | Mangal et al. | |
| 2023/0173941 | A1* | 6/2023 | Meroux | B60L 53/305 |
| 2023/0196234 | A1* | 6/2023 | Bhimani | B60L 53/68<br>705/7.25 |

* cited by examiner

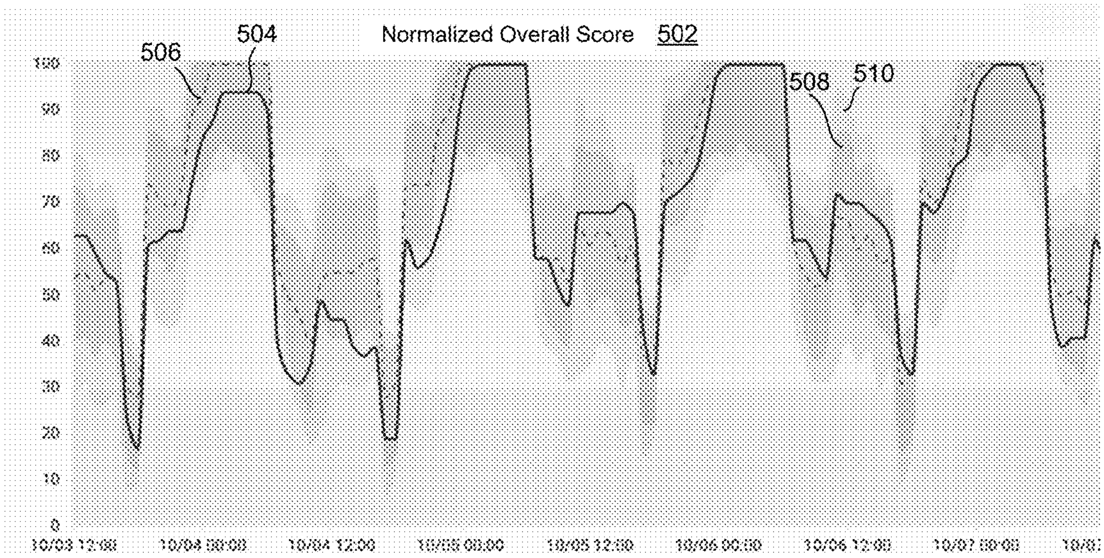
FIG. 6
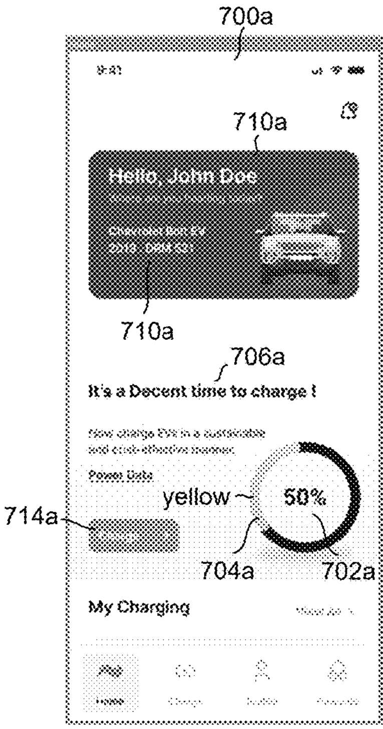
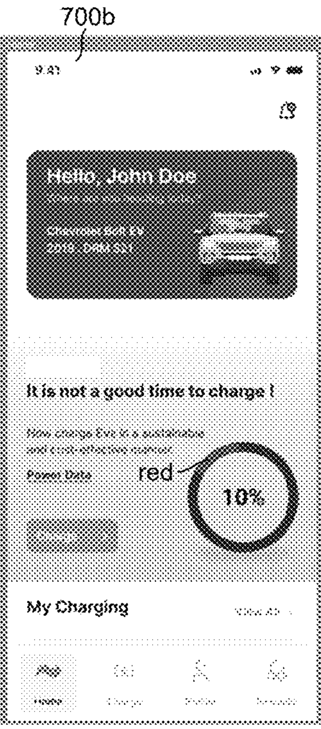
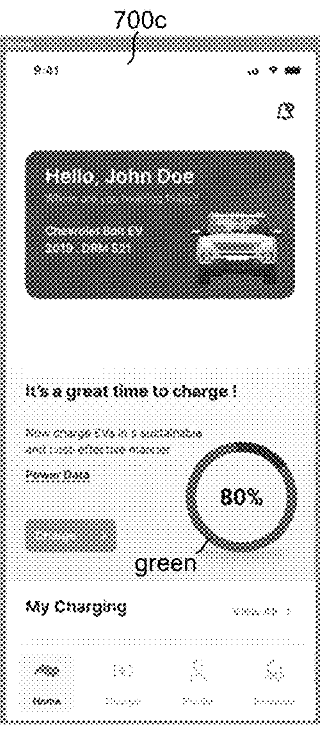
FIG. 7A FIG. 7B FIG. 7C

G – green
Y – yellow
R – red

G – green
Y – yellow
R – red

G – green
Y – yellow
R – red

G – green
Y – yellow
R – red

SYSTEMS AND METHODS FOR PROVIDING CONTROL IN RELATION TO ELECTRIC VEHICLES BASED ON ENVIRONMENTAL EMISSIONS FROM POWER GENERATION SOURCES

REFERENCE TO RELATED APPLICATIONS

This application claims benefit to and/or priority from U.S. Provisional Patent Application No. 63/593,560 filed on Oct. 27, 2023, which is incorporated herein by reference.

FIELD

The present disclosure relates to systems, apparatuses, and methods for providing control in relation to electric vehicles (EVs) or other electrical assets or systems based on information relating to environmental emissions from power generation sources.

BACKGROUND

The energy use by the global transportation sector is one of the main sources of environmental emissions, particularly greenhouse gas emissions (GHG). To mitigate emissions in the transportation sector, and to reduce energy costs, the adoption of EVs replacing fossil fueled vehicles provides a solution to significantly reduce global emissions. This solution depends on a portion, if not most, of the supply of electricity used to power the vehicles being generated by zero emission, renewable energy sources such as wind and solar versus, for example, coal, natural gas and oil, so that the emissions per unit of energy to move an EV considering the generated electricity are lower than the emissions per unit of energy to equivalently move a fossil-fueled vehicle. Otherwise, the increased demand for electricity supply will increase the use of GHG emitting energy and emissions along with the need to provide the additional generation, transmission and distribution infrastructure to provide and deliver the energy to where the EVs batteries are charged.

Renewable energy generation, such as wind and solar power, varies greatly with weather conditions and cannot produce more than the equipment is capable of given the amount of sunshine or wind available. Whereas, dispatchable power generation such as fossil-fueled thermal power stations can be spun up by operators to meet electricity grid demands at short notice. For these reasons, practically all of the global electricity supply available for EV charging is produced with a mix of generation sources, with a corresponding mix of GHG emissions per unit of energy generated, and this mix will vary from location to location and over time. Furthermore, the periods where renewable energy generation is high generally do not match high demand periods or peaks. For example, peak solar generation early in the afternoon on a sunny day, will not match the peak demand later in the day (typically at 5-7 pm) when solar generation, if any, is low and EV owners return home to charge (and also use more electrical appliances at home). Low GHG periods will frequently align with periods where non-dispatchable energy is high, mitigating peaks that would otherwise need GHG emitting gas peaker plants etc.

This means that currently, EV charging not only adds electrical loads to already congested distribution grids, but the carbon content and associated GHG emissions of the electricity supply at that time is higher, thereby requiring significant investments by local distribution companies and power generators, while diminishing the environmental benefits.

In addition, many passenger EVs are owned and charged at drivers' residences or at public charging facilities. Currently, most drivers will simply plug in their vehicle to charge as needed, when a charger is available without consideration of the emissions generated by the energy consumed. Although variable energy pricing, such as time-of-use rates charged by electric power distribution companies, can nudge consumers to shift from typically high demand periods by consumers opting to charge at lower cost periods, which may coincide with a lower emissions generation mix, this is not always the case. In addition, time-of-use rates are typically static or changed very infrequently, for example twice a year, and are for periods typically for many hours.

Accordingly, improvements relating to generating and providing control in relation to EVs and/or other types of electrical assets and systems are desired.

The above information is presented as background information only to assist with an understanding of the present disclosure. No assertion or admission is made as to whether any of the above, or anything else in the present disclosure, unless explicitly stated, might be applicable as prior art with regard to the present disclosure.

BRIEF DESCRIPTION OF DRAWINGS

Example embodiments of the present disclosure will now be described with reference to the attached Figures.

FIG. 6 is a zoomed-in view of a normalized overall score graph of FIG. 5.

FIGS. 7A-C are example graphical user interfaces (GUIs).

Figure 1:
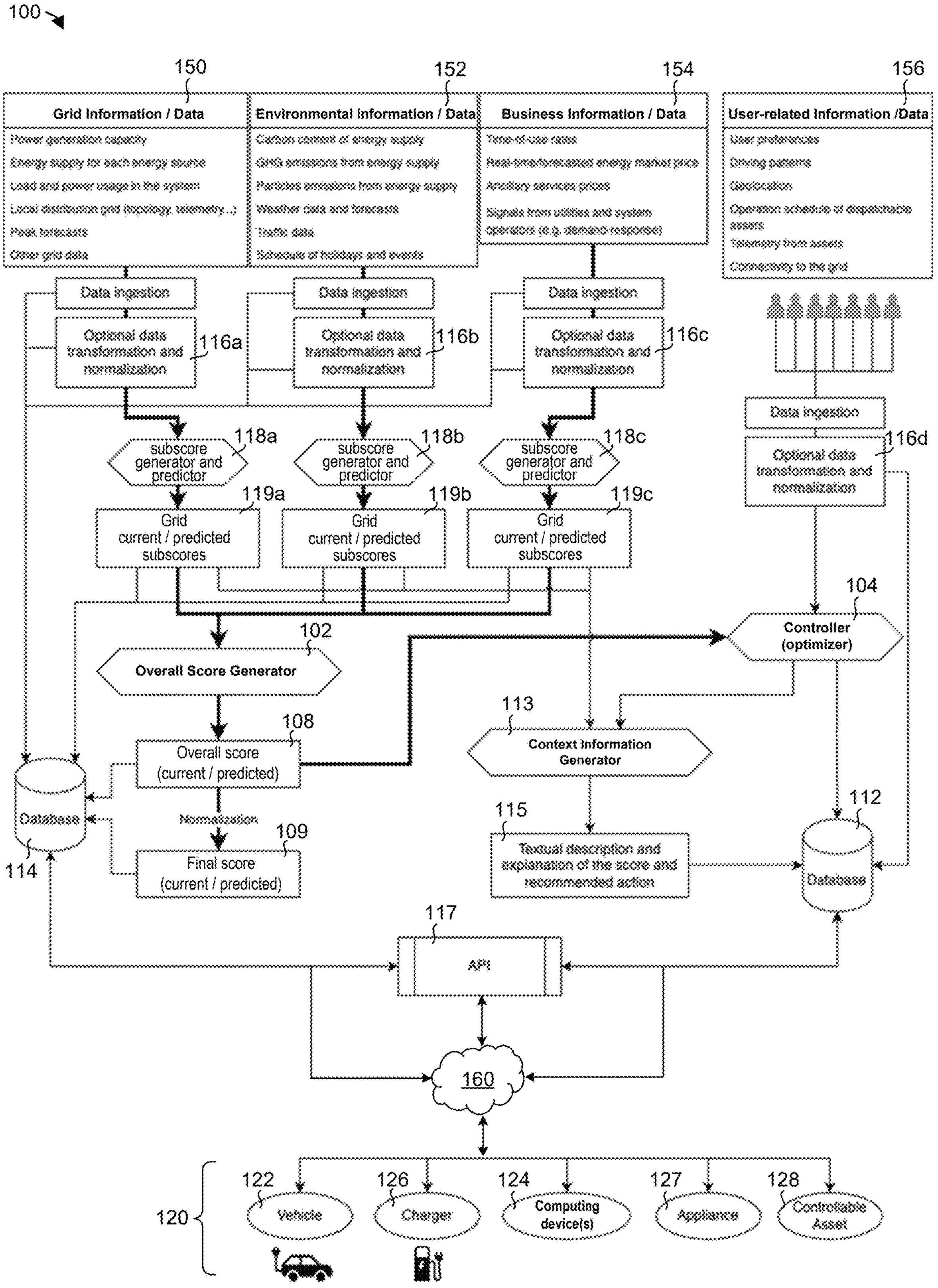
FIG. 1 is a diagram representative of an example control system.

The relative sizes and relative positions of elements in the drawings are not necessarily drawn to scale. For example, the shapes of various elements and angles are not necessarily drawn to scale, and some of these elements may be arbitrarily enlarged and/or positioned to improve the readability of the drawings. Further, the particular shapes of the elements as drawn are not necessarily intended to convey any information regarding the actual shape of the particular elements, and have been solely selected for ease of recognition in the drawings.

DETAILED DESCRIPTION

For EV users such as residential customers with EV chargers at home, there are a number of commercial smartphone apps that claim to support limited degrees of intelligent EV charging. These apps allow the user to link their EV charging hardware to the app, and have some sort of basic control, for example scheduling based on time-of-use pricing for example. Likewise, some EV manufacturers also provide a smartphone app that allows the user to enter basic schedules for their charging. These may allow for manually plugging in at certain times when the energy price is low or delaying the start of charging via an app or settings on the charger to charge at such times. These technologies do not directly coordinate EV charging demand with periods of low emissions electricity supply.

In particular, time-of-use rates or off-peak tariffs are not granular, they typically set pricing for periods of many hours, whereas the environmental emissions from generation can vary widely during those periods. They are also not dynamic and do not adapt to current or future factors affecting emissions such as weather or system demand. Accordingly, these technologies for controlling or affecting EV charging are very limited.

In addition, such methods are also not granular geographically. Rather, they broadly apply to an entire region or the entire service area of a utility without consideration for the topology of electric distribution grid and local power demand at each node in the grid, and are not able to effectively shape the demand at a more local level, for example by minimizing local peaks at a feeder or transformer level. Thus, these technologies for controlling or affecting EV charging are very limited.

Furthermore, these methods do not consider the current mix of power generation sources, let alone predictions of mix of power generation sources. In addition, these methods do not consider current power grid demand or load, or predicted grid demand or load at future times. Thus, these methods do little to shift energy consumed for EV charging or operations of other devices to periods where emissions are lower. Accordingly, these technologies for controlling or affecting EV charging are very limited and inadequate.

According to an aspect, the present disclosure is directed to a system, comprising: a computer-readable storage medium having executable instructions; and one or more computer processors configured to execute the instructions to provide control in relation to operations a plurality of electric vehicles (EVs) associated with a power grid, the instructions to: receive power grid information relating to the power grid, the power grid information including: power grid load information comprising information relating to load on the power grid; power grid load prediction information, which includes information relating to predicted power grid load in one or more future time periods; renewables generation prediction information, which includes information relating to predicted quantities of power generated by renewable power sources in one or more future time periods; receive environmental emissions information relating to a quantity of environmental emissions generated by energy generation sources providing power to the power grid; and provide control in relation to operations of one or more EVs, wherein the providing control comprises: generating an overall score for a time interval based on the power grid information and the environmental emissions information, wherein the overall score indicates a level of suitability for charging an EV during the time interval, wherein higher suitability is associated with a lower quantity of environmental emissions; generating control information based on the overall score, wherein the control information comprises EV charging schedule information; and providing the control information for use by one or more computing devices associated with the one or more EVs for use in controlling of the one or more EVs.

In an embodiment, the generating the overall score comprises: generating a power grid subscore based on the power grid information; generating an environmental subscore based on the environmental emissions information; and generating the overall score based on the power grid subscore and the environmental subscore using an ensemble process.

In an embodiment, at least one of the power grid load information and the power grid load prediction information comprises information relating to at least two different subsets of the power grid, and wherein the generating the overall score for the time interval comprises generating separate overall scores for each of the two subsets of the power grid.

In an embodiment, the instructions are further to: receive location information associated with an EV, wherein the subset of the power grid for which the overall score is generated corresponds to the location information associated with the EV.

In an embodiment, the generating overall score comprises generating predicted overall scores for each of a plurality of time intervals in a time horizon.

In an embodiment, the generating overall score comprises generating context information associated with the overall score, the context information comprising a textual description relating to the overall score, and wherein the providing the control information includes providing the context information.

In an embodiment, the providing control in relation to operations of one or more EVs comprises triggering, in response to the control information, one or more physical actions relating to EV charging in relation to at least one of the EVs.

In an embodiment, the generating EV charging schedule information comprises scheduling charging of at least one EV to optimize one or more overall scores associated with one or more time periods during which the charging is scheduled to occur, wherein the optimizing seeks the one or more overall scores favoring higher suitability for charging.

According to an aspect, the present disclosure is directed to a method comprising: at one or more electronic devices each having one or more processors and computer-readable memory, to provide control in relation to operations a plurality of electric vehicles (EVs) associated with a power grid: receiving power grid information relating to the power grid, the power grid information including: power grid load information comprising information relating to load on the power grid; power grid load prediction information, which includes information relating to predicted power grid load in one or more future time periods; renewables generation prediction information, which includes information relating to predicted quantities of power generated by renewable power sources in one or more future time periods; receiving environmental emissions information relating to a quantity of environmental emissions generated by energy generation sources providing power to the power grid; and providing control in relation to operations of one or more EVs, wherein the providing control comprises: generating an overall score for a time interval based on the power grid information and the environmental emissions information, wherein the overall score indicates a level of suitability for charging an EV during the time interval, wherein higher suitability is associated with a lower quantity of environmental emissions; generating control information based on the overall score, wherein the control information comprises EV charging schedule information; and providing the control information for use by one or more computing devices associated with the one or more EVs for use in controlling of the one or more EVs.

In an embodiment, the generating the overall score comprises: generating a power grid subscore based on the power grid information; generating an environmental subscore based on the environmental emissions information; and generating the overall score based on the power grid subscore and the environmental subscore using an ensemble process.

In an embodiment, at least one of the power grid load information and the power grid load prediction information comprises information relating to at least two different subsets of the power grid, and wherein the generating the overall score for the time interval comprises generating separate overall scores for each of the two subsets of the power grid.

In an embodiment, the method further comprises: receiving location information associated with an EV, wherein the subset of the power grid for which the overall score is generated corresponds to the location information associated with the EV.

In an embodiment, the generating overall score comprises generating predicted overall scores for each of a plurality of time intervals in a time horizon.

In an embodiment, the generating overall score comprises generating context information associated with the overall score, the context information comprising a textual description relating to the overall score, and wherein the providing the control information includes providing the context information.

In an embodiment, the providing control in relation to operations of one or more EVs comprises triggering, in response to the control information, one or more physical actions relating to EV charging in relation to at least one of the EVs.

In an embodiment, generating EV charging schedule information comprises scheduling charging of at least one EV to optimize one or more overall scores associated with one or more time periods during which the charging is scheduled to occur, wherein the optimizing seeks the one or more overall scores favoring higher suitability for charging.

According to an aspect, the present disclosure is directed to a non-transitory computer-readable medium having computer-readable instructions stored thereon, the computer-readable instructions executable by at least one processor to cause the performance of operations relating to providing control in relation to operations a plurality of electric vehicles (EVs) associated with a power grid, the operations comprising: receiving power grid information relating to the power grid, the power grid information including: power grid load information comprising information relating to load on the power grid; power grid load prediction information, which includes information relating to predicted power grid load in one or more future time periods; renewables generation prediction information, which includes information relating to predicted quantities of power generated by renewable power sources in one or more future time periods; receiving environmental emissions information relating to a quantity of environmental emissions generated by energy generation sources providing power to the power grid; and providing control in relation to operations of one or more EVs, wherein the providing control comprises: generating an overall score for a time interval based on the power grid information and the environmental emissions information, wherein the overall score indicates a level of suitability for charging an EV during the time interval, wherein higher suitability is associated with a lower quantity of environmental emissions; generating control information based on the overall score, wherein the control information comprises EV charging schedule information; and providing the control information for use by one or more computing devices associated with the one or more EVs for use in controlling of the one or more EVs.

In an embodiment, the generating the overall score comprises: generating a power grid subscore based on the power grid information; generating an environmental subscore based on the environmental emissions information; and generating the overall score based on the power grid subscore and the environmental subscore using an ensemble process.

In an embodiment, at least one of the power grid load information and the power grid load prediction information comprises information relating to at least two different subsets of the power grid, and wherein the generating the overall score for the time interval comprises generating separate overall scores for each of the two subsets of the power grid.

In an embodiment, the operations further comprise: receiving location information associated with an EV, wherein the subset of the power grid for which the overall score is generated corresponds to the location information associated with the EV.

In an embodiment, the generating overall score comprises generating predicted overall scores for each of a plurality of time intervals in a time horizon.

In an embodiment, the generating overall score comprises generating context information associated with the overall score, the context information comprising a textual description relating to the overall score, and wherein the providing the control information includes providing the context information.

In an embodiment, the providing control in relation to operations of one or more EVs comprises triggering, in response to the control information, one or more physical actions relating to EV charging in relation to at least one of the EVs.

In an embodiment, generating EV charging schedule information comprises scheduling charging of at least one EV to optimize one or more overall scores associated with one or more time periods during which the charging is scheduled to occur, wherein the optimizing seeks the one or more overall scores favoring higher suitability for charging.

According to an aspect, the present disclosure provides improvements to power system and electrical asset control by providing systems and methods for generating a metric in the form of a score, which may generally indicate a suitability for performing one or more operations in relation to an electrical asset, such as an EV. Score information may be generated for a specific time or time period. According to an aspect, the present disclosure utilizes the score to generate and provide control in relation to the asset, for example for providing control in relation to the one or more operations. By generating and/or utilizing such scores, the present disclosure may provide more efficient and/or effective control and management of electric power systems and electric assets, such as EVs, thereby providing improvements in EV and other asset control technologies.

Various example embodiments and features are described in relation to EVs and EV charging. This done merely for ease of description and for simplicity, and is not limiting. The teachings according to the present disclosure apply to all other suitable types of power systems and electrical assets insofar as they are not incompatible. Thus, teachings relating to EVs and chargers may be applied to other types of electrical assets. Similarly, teachings relating to controlling and scheduling of EV charging may be applied to other types of operations associated with other electrical assets. For example, another type of asset may be an appliance such as a clothes washing machine, and an operation may be the running of the washing machine. A score may be generated and may be used for providing control in relation to the washing machine, for example to provide control to when the washing machine operates.

An operation may be any suitable operation and may, in at least some embodiments, relate to providing control in relation to an EV. For example, in one or more embodiments, the operation may include charging one or more EVs. The suitability for performing an operation in relation to an EV may be based on one or more objectives, factors or other considerations. An example objective includes minimizing or reducing a quantity of environmental emissions that are, or likely are, produced to generate the power used for the operation, for example for EV charging. Again, in most power grids, power is obtained for a variety of different generation sources, which usually include of both non-renewable and renewable sources. Another example objective includes maximizing or increasing a quantity or proportion of renewable energy generation that is, or likely is, used to generate the power used for the operation. Another example objective includes minimizing or reducing power demand or load peaks at one or more of the grid level, distribution level, or a local level, such as at a feeder or transformer level. Another example objective includes minimizing or reducing costs relating to the operation, for example costs associated with charging of an EV. A system may have multiple objectives, and some of the objectives may or may not conflict with one another.

The term environmental emissions generally refers to any types of emissions into the environment produced by or otherwise caused by the generation or capture of energy, for example GHGs, which can generally include carbon dioxide ($CO2$), as well as other gases such as methane ($MH4$). Environmental emissions are often referred to herein simply as "emissions" for simplicity.

A score may be associated with a specific geographic region or area, a specific portion or subset of a power grid, and so on, since different scores may be generated for different regions or subsets of a power grid since conditions in and/or affecting those different regions or subsets may differ. For example, within a subset of a power grid, for example downstream from a feeder or a local transformer, the electrical load in that subset of the grid, and possibly constraints in that subset of the grid (for example a maximum threshold permitted load, for instance to avoid damage to the electrical equipment of the grid) are specific to that subset of the grid. A score may be generated for a location or region where EV charging takes place (for example by GPS coordinate or user's set location). A score may be provided at various levels of granularity, for example local to a building, neighborhood, region, city, and so on. A score is easily translated into environmental emissions savings (for example, kgCO2e) which may be used for incentive programs by a provider, aggregator, or electrical utility, for example for translating good behavior (for example charging at high score periods versus low score periods) into rewards.

A system may generate a score and may utilize the score to generate and provide control in relation to one or more EV. The system may utilize the score, for example by generating or providing control information to EVs or to devices or systems that are associated with EVs, which may include EV charging equipment, or to any other devices or systems. In at least some embodiments, the score itself may be the control information, or be at least part of the control information.

Control information may include actions or instructions to be taken by EVs, other assets, or other computing devices, or may include recommendations for actions associated with the assets. An example of an action is for an EV, which is plugged into an EV charger, to begin charging at a specific date and time. This action may be implemented without any user interaction since the EV is plugged in and the system may send the EV or the charger an instruction to begin charging. Another example of an action is for an EV to begin charging at a specific date and time even though the EV is not plugged into a charger. Such an action would likely require user involvement at least to park the EV and plug the EV into a charger. Alternatively, if the EV is a self driving vehicle, it may be possible for the EV to drive to a charger and to couple with the charger without user interaction. An example of a recommendation is to provide an indication to an electronic device associated with the EV, for example to a mobile device of a driver of the EV or any other device, to begin charging at a specific date and time. The recommendation may be outputted by the electronic device to be received by the driver. For ease of reference, actions or recommendations may be referred to collectively herein simply as "actions" but is to be interpreted to include both unless indicated otherwise or results in some obvious inconsistency. Example actions or recommendations include EV charging schedule information, which may include indications for specific EVs of when to charge (for example at a specific time or during a time period or interval), where to charge (for example an identification or indication of a specific charger or a specific geographic area known or assumed to have one or more chargers), how to charge (for example a charging rate), and so on.

In at least some embodiments, the system generates a simple and clear metric in the form of a score, which may indicate a suitability of a particular time (the present time or at a future time) to charge the EV, and optionally a particular location to perform the charging, where the suitability is at least partly based on an amount of environmental emissions that are produced to generate the electricity in the power grid that would be used at that particular time. In other words, in an aspect, the score may provide information to assist in a decision of when to use electricity that has the best potential to be 'green', meaning produces fewer emissions, and to avoid electricity that is generated with higher emissions.

A score may take any suitable form. For example, a score may be in a numerical format, for example a score on a scale of 0 to 100, where 100 is a very suitable or optimal time to consume power from the power grid, and where 0 is a very unsuitable or worst time to consume power. In other embodiments, a score may not be numerical. A score may be in other forms or representations, for example such as 0 to 5 star rating, or a color-based representation such as a red-yellow-green rating, for example where red indicates very unsuitable, yellow indicates somewhat suitable, and green indicates highly suitable. A score may comprise or be made up of several scores. A score may be generated for current conditions. In addition, scores may be generated for one or more future times or time periods, and such scores may be generated at least partly based on predicted power grid conditions. A score may be in the form of a single value, such as a numerical value, or a value with an indicator that it will trend upwards or downwards with time, or a time series of scores for a specified time period. An indicator may be part of the score or of context information. For example, an indicator may indicate that a score is predicted to trend upwardly, and may specify an amount of time into the future, for example trending upwardly over the next 3 time periods or next 3 hours, etc.

The generation and use of scores for future times may be particularly beneficial, for example in relation to operations that may take a long time, such as charging an EV, which may often take several hours. A goal or objective may be to optimize for an entirety of a charging session.

In addition, a system may generate and provide context information relating to a score, for example in the form of an explanation of the score. Context information may be optionally exposed to a driver or other person, which may be relevant for trustworthiness of the score and to possibly drive user behavior. In addition to a score, a system may make a recommendation (for example using plain text) to a driver or other person, for example using heuristics, generative Al or large-language models.

A system may use various input information to generate a score, and the system may utilize the score to generate and provide control in relation to one or more EVs or other assets. In at least some embodiments, the generated control information may exert control over the one or more EVs, for example to shift at least some EV energy consumption from charging in the power grid to one or more lower environmental emissions time periods. In such a way, EV charging demand may be actively shifted to lower environmental emissions periods by methods.

This may be achieved by, for example, providing control information including a generated score to an EV, for example to an application on a mobile device of the driver. The application may output the score, for example on a display of the mobile device, and the driver may take action in response to the outputted score. For example, the driver may charge the EV now or at a later time by plugging the EV into a charger or by setting a charging schedule through manually setting a charger control system.

In at least some embodiments, a score for a current time period and optionally scores for one or more future time periods may be provided to an automated charger control system to schedule charging of one or more EVs and optionally to modulate energy used for charging of the EVs.

In at least some embodiments, a power distribution utility that manages multiple EV consumers that have opted into programs to allow the utility to control their EV chargers may use the scores as input to a control system for generating signals to feed to those EV chargers to effect control of individual chargers, thereby potentially shifting at least some energy consumed by EV charging to minimize or reduce an total amount of environmental emissions produced by energy sources that provide the power used by the utility. This may form part of a demand response program that the utility offers to support their grid by mitigating peaks and smoothing demand to operate within the constraints of their utility network. These signals may be communicated directly to the end consumer, or through a third party such as an aggregator or vehicle OEM for example.

In at least some embodiments, a method or system according to the present disclosure for generating a score considers information relating to the health of the power grid and the environmental emissions to produce energy. The generation of the score may take into account several factors or other input information affecting the amount of environmental emissions that consuming electricity at a particular time and place will incur, which may include one or more of the mix of generation sources (for example 30% coal, 20% natural gas, 20% nuclear, 10% hydroelectric, 10% solar, and 10% wind), local grid status (a local grid may refer to a subset of a power grid), local grid demand predictions, predicted load peaks, consideration of effect on asset lifetime and health (avoid peaks, avoid overload on utility network as constraints and other factors such as utility battery ESS (BESS) degradation), and so on.

In at least some embodiments, the present disclosure utilizes artificial intelligence (AI) or Machine Learning (ML) data driven techniques to generate or derive the scores based on one or more of current or real-time, predicted, and historical data and information. The use of Al or ML techniques may provide advantages over alternative rules-based computational methods since an Al or ML system may allow for adaptation and may dynamically react to optimize behavior (for example, accuracy of predictions) as many factors change in the system. An aspect of this approach may comprise optimizing the system taking the scores generated and response(s) to the score as feedback.

The teachings according to the present disclosure may be applied and implemented in various different fields and applications. For example, the present disclosure may be applied to EV applications, EV chargers and charging equipment, and any other suitable types of assets and systems, for example other electrical assets such as appliances, heating, ventilation and air conditioning (HVAC) equipment and systems, and so on. Accordingly, as noted above, while various example embodiments and features are described in relation to EVs and EV charging, this done merely for simplicity and is thus not limiting. The teachings according to the present disclosure apply to all other suitable types of power systems and electrical assets insofar as they are not incompatible.

The terms "prediction" and "predictor" are generally used herein for simplicity to include and to synonymous with forecasts and forecasters, estimates and estimators, and other similar terms. Although, in some instances, the terms forecast and forecaster may be used, for example "weather forecast" and so on. In addition, the terms "status" and "state" are generally used interchangeably.

The present disclosure generally relates to improvements in computer-based technologies relating to electrical power system and electrical asset management and control. Electrical assets may comprise EVs, electric appliances, and any other electrical devices and systems. In an aspect, controlling a system may comprise, for example, generating metrics, for example scores, that represent or indicate a suitability of performing operations relating to one or more electrical assets, such as EVs, at one or more specific time periods. Again, suitability of performing an operation may be based on one or more objectives or factors. An example objective includes minimizing or reducing a quantity of environmental emissions that are, or likely are, produced to generate the power used for the operation, for example for EV charging. Score information may be used by a controller for generating control information, which may be used to control operations of one or more assets relating to a power grid, for example charging a device using power from the grid, or operating a device using power from the grid. The control may be in the form of scheduling, for example when an operation begins or ends, a rate of power being consumed, the location or region in the grid in which the consumption occurs, and so on. The score information enables users and grid operators, as well as computing devices and systems, to exert more informed decision making in regard to the operation of assets in the power grid, which in turn may improve the operating efficiencies of the power grid by, for example, increasing the consumption of power generated by cleaner or renewable generation sources, which may in turn reduce the need for on-demand power generation sources, such as coal or gas fired plants. Increasing the consumption of power generated by cleaner or renewable generation sources may generally reduce the consumption of power generated by dirtier or non-renewable generation sources. This all may provide for the more efficient and effective control and operation of assets in a power grid.

FIG. 1 is a diagram representative of an example control system 100 according to the present disclosure. Control system 100 may generally generate control information for providing control in relation to one or more assets 120, such as EVs 122, EV chargers 126, appliances 127, or any other suitable controllable asset or system 128. Control information may include one or more generated scores, or one or more actions or recommendations for providing control in relation to the one or more assets. Control system 100 may be used in association with a power grid.

System 100 comprises an overall score generator 102, which generates an overall score 108. In addition, system 100 may comprise a controller 104, which may include one or more optimizers, for generating control information for providing control in relation to one or more EVs 122 or other assets or systems associated with the power grid. Assets may be associated with the power grid in that the assets may consume power from the power grid.

System 100 may receive information or data of any suitable types and from any suitable sources. For example, system 100 may receive information relating to one or more of power grid information 150, environmental information 152, business information 154, and user-related information 156. These classifications of information may be somewhat arbitrary and are merely examples. Information may be organized or classified in any other suitable ways.

The data or information may be historical data, streaming or live data, and/or predicted data. The data or information, or their sources, may be specific to one or more particular locations, regions, subsets of a power grid, and so on, hereby referred to as "regions" for simplicity, and may be of any suitable granularity, for example from street level, country-wide, downstream of a transformer, downstream of a feeder, and so on. Information may be divided by regions since scores generated for different regions may be different due to differing conditions in or in relation to those regions. For example, a current load or a predicted load on a power grid from one region may differ from that of another region. Accordingly, the scores generated for each region may differ.

In at least some embodiments, at least one of the grid load information and the grid load prediction information comprises information relating to a subset of the power grid, and the generating overall score information for the time interval comprises generating overall score information for the subset of the power grid. In at least some embodiments, at least one of the grid load information and the power grid load prediction information comprises information relating to each of at least two subsets of the power grid, and the generating overall score information for the time interval comprises generating overall score information for each of the at least two subsets of the power grid.

In at least some embodiments, at least one of the power grid load information and the power grid load prediction information comprises information relating to at least two different subsets of the power grid, and the generating an overall score for a time interval may comprise generating separate overall scores for each of the two subsets of the power grid. In at least some embodiments, the system may receive location information associated with an EV. A subset of the power grid for which an overall score is generated may correspond to the location information associated with the EV.

Figure 2:
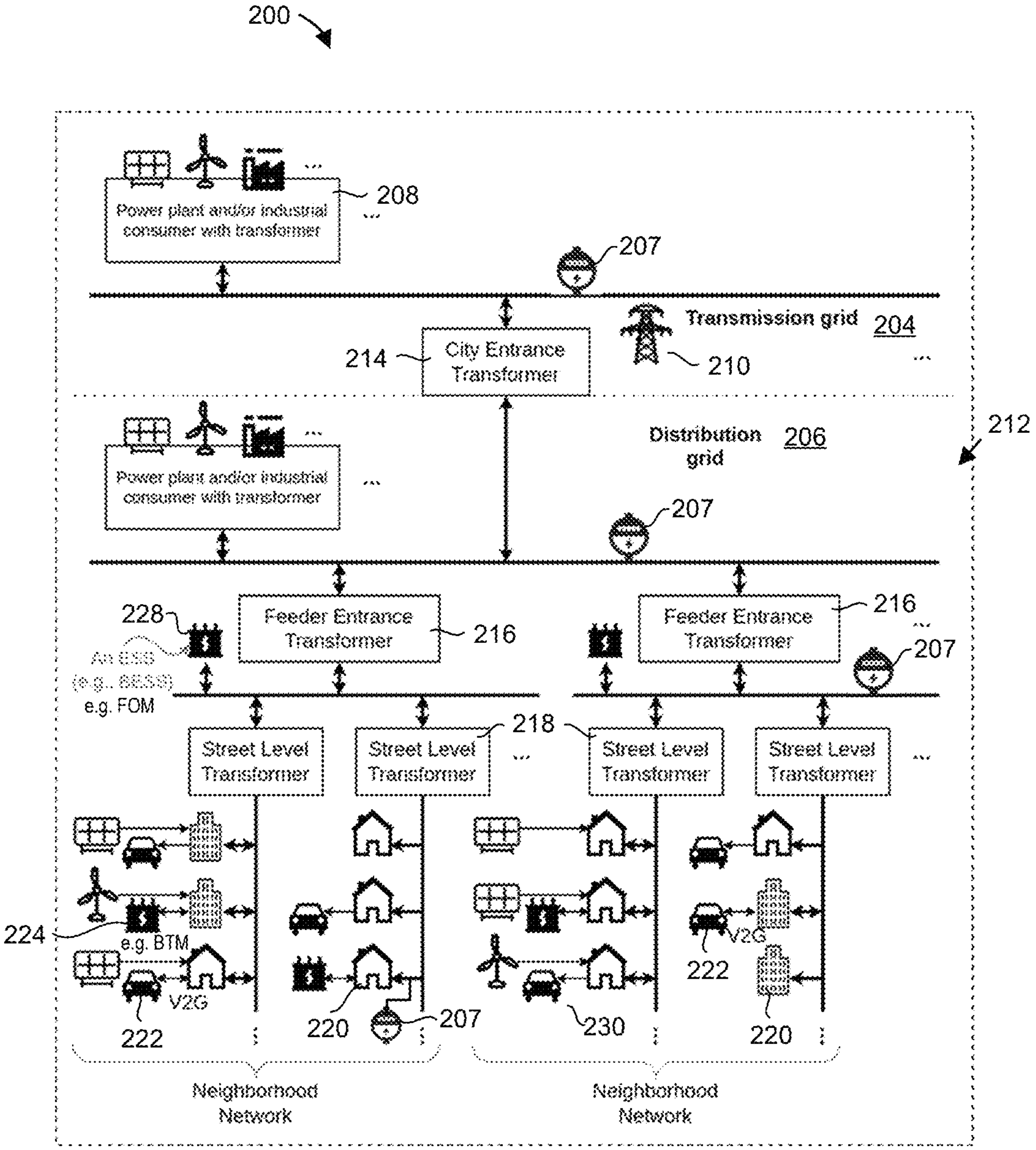
FIG. 2 is a diagram of an example power grid.

Grid information 150 may comprise, for example, one or more of overall generation capacity of the system; amount of energy generated by each energy source (including for example wind, solar, hydroelectricity, nuclear, coal, gas, etc.); overall load in the system; local distribution grid data (such as substations, transformers, feeders); topology; maximum capacity and safety margins; operational constraints; telemetry (historical, live, predicted), including load, voltages, sensor data such as temperatures; peak forecast considering head room on grid, for system and local constraints. Peaks may be predicted for the entire system, or for any subset of the system, including city-wide, or for individual component of a grid. An example power grid 200 is shown in FIG. 2, which is described further below.

In addition, grid information 150 may include power grid load prediction information, which may include information relating to predicted power grid load in one or more future time periods. In addition, grid information 150 may comprise renewables generation prediction information, which includes information relating to predicted quantities, proportions, etc. of power generated by renewable power sources in one or more future time periods. In some embodiments, system 100 may predict renewables generation. In addition, grid information 150 may include information relating to energy generation, such as historical, current and future levels of energy generation, and energy generation levels may include generation at any sources such as power generating plants 208 (FIG. 2) and/or from any other sources, such as renewable generators within or connected to the power grid. In addition, grid information 150 may include readings or other information from meters, such as transmission meters and distribution meters, within a power grid such as voltages, currents, power levels, and so on. In addition, grid information 150 may include information relating to components in the power grid, such as grid topologies, including primary and secondary topologies, meter readings at substations, feeders, transformers, BESSs, and technical specifications, such as types, technical specifications and constraints, operational limits, and so on, of components such as transformers, substations, BESSs, and so on.

Environmental information 152 may comprise, for example, one or more of environmental information; contextual data or information; carbon content of the energy supply; GHG or other emissions from the energy supply, which may include figures for each of the various types of power generation, such as gas, coal, wind, solar, etc.; weather data and forecasts; traffic data; schedules of past and upcoming events (for example holidays, sports events, etc.). In addition environmental information 152 may comprise environmental emissions information relating to a quantity of environmental emissions generated by energy generation sources providing power to the power grid. Quantity information may be in any form or type.

Business information 154 may comprise, for example, one or more of time-of-use energy rates or prices; real-time and predicted energy market price; ancillary services rates; signals from the grid operators or utility company (such as demand-response event). In addition, the business information may include information relating to historical, current, real-time, and future predicted energy price information, which may be or include energy market price information, time of use pricing information, service level agreement (SLA) information between a service provider, such as a power system operator, and a customer, where SLA information may include service level objective (SLO) information, other business or contractual or related information or metrics.

User-related information 156 may comprise, for example, one or more of constraints; charging events from users; geolocation; connectivity to the grid; driving patterns; user preferences; operational schedule of the dispatchable assets (EV, heat pump, etc.); telemetry or telematics information relating to the assets (state of charge of the battery, state of health, charging profile). EV user preferences or behaviors may include patterns of charging times, locations, charging lengths, departure and arrival times, SoC information at departures and arrivals, and so on. Generally, telematics data may include any information or data relating to a vehicle, including but not limited to SoC of a battery of an EV, energy level of the battery, vehicle location, route, number of stops, tire pressure, idling time, speed, rate of acceleration (for example gentle, medium, or high), rate of braking, fuel consumption, vehicle faults, vehicle diagnostics, and so on.

The system 100 may receive other types of information, some of which may originate from outside the system. External data may include information relating to historical, current, real-time, and future predicted weather information, greenhouse gas or other environmental emission information, or any other suitable information. Weather information may include, for example data relating to sunlight, irradiance, cloud coverage, precipitation, storms or other weather events, wind speed, temperature, or humidity, and so on. Weather may impact renewable generation, for example since various sources of renewable energy are intermittent and not continuous. In addition, weather may impact EV behavior, such as if and when EVs are on the road, the amount of time it takes for their journeys, and so on, which in turn may affect EV charging demand.

In addition, control system 100 may receive information relating to the power grid, such as but not limited to current and historical power demand and power supply, transformer or substation data, voltage levels, current loads, power flows, error codes, load demand, grid congestion, advanced/smart metering infrastructure (AMI) or any other types of suitable information from or relating to the power grid. A demand or load on a power grid may be the total electrical power being drawn by users of the power grid. In addition, system 100 may receive information such as weather related data and/or geo data, geographic information system (GIS) or mapping information, telemetry information, business information, or any other suitable information. This information may be generally referred to as environment data, although other types of information may also be included. Further, other types of environment data may include, for example, information on renewable energy generation and availability, energy grid operational parameters, electric vehicle and/or vehicle depot information, actual EV charging demand, predicted EV charging demand, energy market information, route manager information relating to vehicles, renewable energy information, energy cost information, or any other suitable type of information.

Furthermore, control system 100 may receive information from assets associated with a power grid, such as from EVs 122, EV chargers 126, appliances 127, any other suitable controllable asset or system 128, for example ESSs such as BESSs, or any other computing devices 124, and so on. This may be any type of suitable data or information available at or from the assets, including any of the various types of information described herein. This may include EV charging goals, EV telematics information, other EV data such as battery SoC, battery state of health (SoH), EV mileage, EV user preferences and habits, on-site power generation information, ESS information, and so on. In an embodiment, at least some of the information may be streaming data, real time data, and/or live data.

Referring again to FIG. 1, system 100 may ingest the various information using any suitable techniques, for example one or more various protocols, for example Representational State Transfer (REST) application programming interfaces (APIs), websockets, Secure File Transfer Protocol (SFTP), MQTT, and the information or data may be transformed or normalized before being stored in a database.

System 100 may comprise one or more data processors 116*a*, 116*b*, 116*c*, 116*d* for performing operations on ingested data or information, for example data cleaning, data warehousing or other operations. A data processor may be implemented in software or in any other way. Data received by a data processor may be cleaned, conditioned, or otherwise modified. A data processor may transform data into a format more suitable for machine learning techniques. In addition, a data processor may perform one or more of data processing and feature selection, for example for the purposes of preparing training data for use by a predictor training module or an optimizer training module. Data from a data processor may be provided to another modules or components, such as database 114 or controller 104 and so on.

Data and other information may be stored in one or more repository databases, for example database 114. The stored data may include historical data, processed data, subscores 119*a-c*, overall scores 108, final scores 109, and so on. A database may comprise one or more databases stored on one or more computing devices.

In addition, system 100 may generate one or more subscores. In at least some embodiments, system 100 may comprise one or more subscore modules 118*a*, 118*b*, 118*c*. A subscore module may comprise a subscore generator, which may comprise one or more scoring models. In addition, a subscore module may comprise a predictor, which may comprise one or more predictor or forecaster models for predicting one or more types of information. A score generator may generate a subscore for a current time period, referred to as a current subscore. In addition, a score generator may generate a subscore for a future time period, referred to as a predicted subscore, and may do so based at least in part on predicted information, for example from one or more predictors.

In at least some embodiments, for each information classification, historical and/or live data may be used to build scoring models and/or prediction models. Scoring models and/or prediction models may be built for each of one or more regions. The building of models may be done in any suitable way, for example using heuristics or by training artificial intelligence (AI)/machine learning (ML) models. ML models include in particular kernel-based algorithms (for example support vector machines (SVMs), etc.) tree-based algorithms (for example, Random Forest, Light Gradient Boosting Machine (LGBM), etc.) or neural nets (for example, Recurrent neural networks (RNNs), Long Short-Term Memory (LSTM), Convolutional Neural Network (CNN), etc.) or any combination of the above.

Control system 100 may comprise one or more training modules, not shown, for training one or more models in the system, for example one or more models of score generators, subscore generators, controllers, predictors, context information generators, and so on. Training data used for the training may comprise any suitable data within the system and/or acquired from outside the system, and may comprise historical and/or current data.

The scoring models and/or prediction models may be used to infer a current subscore, for example for each of one or more information categories, and for each region. In addition, a scoring model may generate subscores for one or more future time periods, and such subscores may be at least partly based on predicted information. For example, a scoring model may generate a time-series prediction for future predicted subscores for each information category. For example, a grid information subscore may be generated for the current time, to. In addition, the grid information subscore may be particular to a particular region, for example geographic region R1. Subscores may be generated for each of one or more different regions, for example R1, R2, R3, etc. In addition, subscores for one or more future time periods may be generated, for example for time periods t1, t2, t3, and so on. These subscores may all be specific to one or more regions.

In at least some embodiments, the system may generate a power grid subscore based on the power grid information, generate an environmental subscore based on the environmental emissions information, and generate an overall score based on the power grid subscore and the environmental subscore, for example using an ensemble process.

Subscores 119*a*, 119*b*, 119*c* may be generated at any suitable times, for example on-demand, in real-time, on regular or irregular cadence (for example, every 1 minute, 5 minutes, 1 hour, and so on). In at least some embodiments, subscores may be generated in response to a request for, or at the same or similar times as, overall scores. Data sources often publish data asynchronously and at different frequencies. In a case of missing input data (for example due to network delays, etc.), a last known value or a predicted value may be used instead.

Overall score generator 102 may receive or acquire the one or more current subscores 119*a*, 119*b*, 119*c*, and which may optionally include one or more predicted subscores, and may generate an overall score 108 (current and predicted), for example by combining the subscores, for example using one or more ensemble techniques or processes, which may be any suitable technique, for example, using weighted combinations, and/or machine learning models (for example, SVMs, LGBMs, neural nets, etc.). For example, an overall score may be generated for a current time, to, and may be generated for one or more future time periods, for example t1, t2, t3, and so on. In addition, as with the subscores, overall scores may be generated for each of one or more different regions, for example R1, R2, R3, etc.

In at least some embodiments, overall score generator 102 may generate an overall score for a time interval based on one or more of power grid information and environmental emissions information, wherein the overall score may indicate a level of suitability for charging an EV during a time interval, wherein higher suitability may be associated with a lower quantity of environmental emissions. Similarly, lower suitability may be associated with a higher quantity of environmental emissions.

An ensemble process may be configurable based on user input. For example, input may provide or adjust parameters of the ensemble process, which may enable a user to configure or fine-tune and customize an overall score, for example based on user preference. The overall score may be normalized for each user/region.

In addition, an overall score 108 may be normalized to create a final score 109.

The following example illustrates an algorithm that may be used in generating a score or subscore. This example shows an example generation of a subscore based on grid information. The example uses a score out of 100 points and maximum points are allocated for each of several factors. The available points total 100. The points allocated in this example are shown in the right most column. In addition, the subscore may be generated for a specific location, which may be a subset of a power grid.

TABLE 1

| Factor / input | Maximum point allocation | Allocated points in example |
|---|---|---|
| Grid mix - current % of max renewable / low carbon | 40 | 10 |
| Traditional established off peak hour | 10 | 6 |
| Grid load - current versus predicted (or max) points (Above prediction or max 0 points) | 20 | 15 |
| Grid load prediction - increasing or decreasing | 10 | 8 |
| Renewable prediction - increase next 3 hours | 20 | 4 |
| TOTALS | 100 | 43 |

A "grid mix" metric may represent a proportion of current power that has been generated from renewable and/or cleaner generation sources. Generation sources may be considered renewable or clean based on any desired criteria. In the example, 25% of the current power in the grid, or subset of the grid, was, or was estimated to be, generated from renewable generation sources, such as wind, solar, biomass, and so on. Accordingly, 10 points out of 40 points are allocated for this metric since the percentage of renewable generation is considered low. However, in another embodiment, 25% may be considered decent, and more points could be allocated (for example 20 points).

A "traditional established off peak hour" metric may represent an off peak hour or time period that may be considered traditional. In the example, 6 points out of 10 points are allocated.

A "grid load-current versus predicted" metric may represent whether the current load in the grid, or subset of the grid, is below, above, or around a predicted load value. If the load is higher, a lower number of points, or 0 points may be allocated. The lower the load is relative to the prediction, the higher number of points may be allocated. In the example, the current load is a bit below the predicted amount, so 15 points out of 20 points are allocated.

A "grid load prediction" metric may represent whether the load in the grid, or subset of the grid, is predicted to increase or decrease in one or more upcoming time periods. In the example, the load is predicted to go down, so 8 points out of 10 points are allocated.

A "renewable prediction" metric may represent a predicted amount of renewable generation in one or more upcoming time periods, for example in the next 3 hours. In the example, the predicted amount of renewable generation is fairly low, so 4 points out of 20 points are allocated.

A subscore may then be calculated based on the points allocated for the various metrics. In the example, the allocated points total 43 points.

In general, points for each metric may be allocated in any suitable way and how the allocations are performed could be configured by a user. In addition, points for each metric, which in themselves may be considered subscores, may be generated or allocated in any way and on any scale. Such values may then be converted into any suitable scale for use in calculating the subscore. For example, a grid mix metric could initially be out of 100 points (e.g. 25 points out of 100) and then be converted to be out of 40 points (10 points out of 100). In addition, in the example, the factors or metrics, the maximum point allocations, the actual point allocations, and so on, are all example only.

Information may be provided to controller 104, which may include one or more optimizers, to generate control information for providing control in relation to one or more EVs 122 or other assets. The information may include one or more of overall scores 108, subscores 119*a-c*, user-related information 156, other information, and so on. Generated control information may include any types of information, for example schedule information relating to operations of one or more EVs or other assets. Controller 104 or an optimizer may include a scheduler for generating optimized or efficient schedule information relating to operations for assets, for example EV charging schedule information. Control information may attempt to optimize or otherwise improve one or more operations or behaviors of assets, and may attempt to minimize or reduce the negative impact of operations of the assets, for example on the power grid or on the environment.

EV charging schedule information may include charging related actions, such as commanding specific EVs when to begin charging, when to stop charging, time periods during which to charge or not charge, a charging rate (for example charging current) to be used for charging, a specific charger to be used, a specific geographic region or area in which to charge, a charging schedule, which source(s) of power to use to charge EVs, if or when or how to use energy stored in some EVs to charge other EVs, and so on. EV charging schedule information may be generated based on score information. For example, the generation of a schedule may attempt to minimize or eliminate any charging during periods of time when a score is, or is predicted to be, above or below some specified threshold, for example to minimize or reduce emissions associated with power used for the charging.

Control information, user-related information 156 whether processed or not, or any other types of information may be stored in one or more data repository databases 112.

An application programming interface 117 may enable communications between one or more components of system 100 and one or more assets 120, such as EVs 122, chargers 126, computing devices 124 which may include web or other applications, appliances 127, or any other type of asset or system 128. However, in other embodiments, system 100 may communicate with assets 120 in any other way and without necessary going through API 117.

Control system 100 and the one or more assets or other devices 120 may be communicatively coupled in any suitable ways, including over any one or more suitable communication mediums 160, such as communications channels, connections, networks, shared memory resources, and so on, which may be wired and/or wireless, and which may include the Internet. In general, for simplicity, references herein to the internet include other communication networks and communication channels other than the internet.

Control information may be provided for use by, or in relation to, one or more assets 120, such as an EV 122. Mention in the present disclosure of scores, control information, actions, instructions, recommendations, or any information being provided, sent, transmitted, shared, pushed, pulled, or otherwise, to an EV, a driver, or any other person, generally includes this information being communicated or otherwise provided to one or more computing devices associated with the EV, driver, other asset, or with the system generally. A computing device may be any computing device or system, for example a smartphone or other device associated with a driver of the EV, a device or system onboard an EV such as an automative control system of the EV, an infotainment system of the EV, any other device or system in or on the EV, a computing device at or controlling an EV charger, or a remotely located computing device.

In at least some embodiments, a computing device executes or triggers one or more physical actions based on the control information. An action may involve, for example, starting charging of an EV, stopping charging, setting or adjusting a charging rate, or similar actions for other assets such as appliances or other devices such as starting operation of the asset, stopping operation, and so on. The executing or triggering of actions may be partially or fully automatic, meaning without any human intervention.

In at least some embodiments, control information, which may include score information, may be provided to an onboard computer system of an EV or a computing device of a charger to provide automatic grid-aware charging capabilities, such as starting or stopping charging based on score information or other control information. Automatic control may be performed based on a score being above a predefined threshold. For example, when an EV is plugged in or otherwise coupled to a charger, the EV or the charger may start, stop, or adjust the charging of the EV based on score information or other control information obtained from controller 104 of control system 100.

System 100 may further comprise a context information generator 113 to generate or provide context information 115 relating to scores or control information. Context information generator 113 may use any suitable information, for example overall scores 108, subscores 119*a-c*, control information from controller 104, or any other information. Context information 115 may be of any suitable type, including user-friendly explanations or information relating to control information or score information. Context information may include one or more of textual or visual descriptions. Context information may provide information to assist with the interpretation or understanding of control or score information. Context information may indicate a significance of a pattern, for example a drop in a score, or recommended actions.

Context information generator 113 may include an engine that generates the context information 115 in any suitable way, for example based on heuristics, or on more sophisticated generative AI models such as pretrained large-language models. As a mere example, generator may produce context information based on a score of 85 out of 100 to include an indication that now is a good time to charge an EV.

In at least some embodiments, generating an overall score comprises generating context information associated with the overall score, the context information comprising a textual description relating to the overall score. Providing the control information for use by one or more computing devices associated with the one or more EVs for use in controlling of the one or more EVs may include providing the context information, for example for use by the one or more computing devices.

Some examples of context information are shown in the example graphical user interface (GUI) of FIGS. 7A-C, FIG.

Figure 9A:
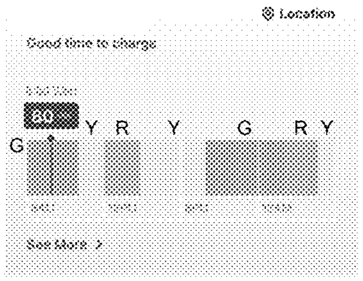
FIGS. 9A-C are example GUIs.
Figure 9B:
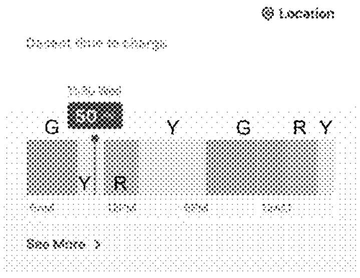
Figure 9C:
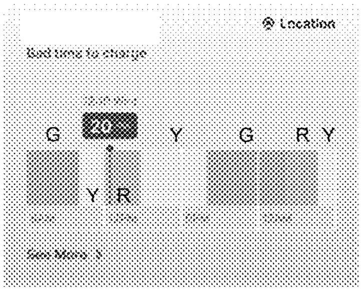

8 and FIGS. 9A-C. These example GUIs may be displayed on one or more computing devices to any suitable persons, for example drivers, grid operators, utility companies, or any other persons. A computing device may be any such device, for example a mobile device, a device onboard an EV, and so on.

FIG. 7A shows a GUI 700*a* displaying overall score 702*a* of 50%, context information in the form of a color (yellow) 704*a* displayed in a visual representation of a gauge, and context information in the form of a text description 706*a* ("It's a decent time to charge"). The context information 704*a* and 706*a* provide some context for the score of 50%, namely the color yellow and the gauge indicating it is a decent time to charge, which is neither bad nor good, and the text indicating the same. GUI 700*a* may also include information such as driver name or other identifier 710*a*, EV identification information 712*a* such as make and model, year, and license plate number. In addition, GUI 714*a* may include functionality, such as buttons or other input items for enabling user input of any kinds, for example to trigger one or more actions, such as starting or stopping charging, scheduling charging, and so on. The charging actions or scheduling may be based on one or more constraints, such as user preferences or power grid constraints.

FIGS. 7B and 7C are similar to FIG. 7A, although FIG. 7B shows a score of 10%, red color and text indicating that it is not a good time to charge, and FIG. 7C shows a score of 80%, green color and text indicating that it is a great time to charge.

Figure 8:
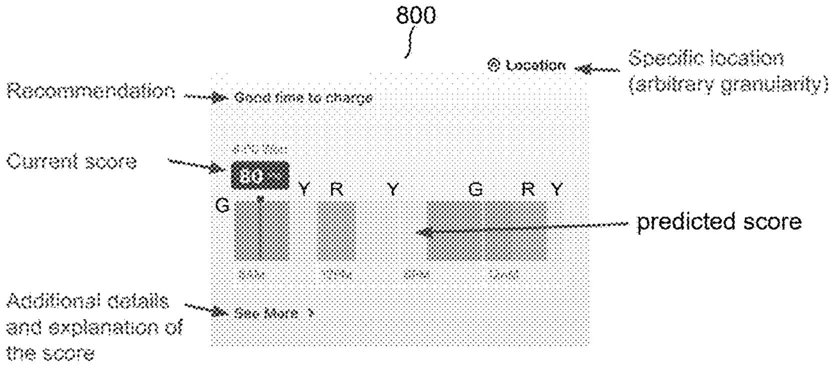
FIG. 8 is an example GUI.

FIG. 8 shows a GUI 800 displaying a current score of '80' and green, as well as several predicted scores for future time periods. Day and times are also shown. The predicted scores are indicated with colors (green, yellow, or red) but may also include numerical or other visual representations. In addition, GUI 800 provides context information, for example the colors of the scores, which provides context regarding the relative suitability for charging indicated by the scores. GUI 800 also provides context information in relation to the current score in the form of a textual description "Good time to charge". In addition, GUI 800 provides information relating to the location or region with which the score and other information is associated with.

FIGS. 9A-C show GUIs 900*a*, 900*b*, 900*c* representing displayed information at different times on a same day for a same location. FIG. 9A shows a current score of '80' at 8:00 and context information including the color green and text indicating "Good time to charge". FIG. 9B shows a score of '50' at 11:30 and context information including the color yellow and text indicating "Good time to charge". FIG. 9C shows a score of '20' at 12:10 and context information including the color red and text indicating "Bad time to charge".

Referring again to FIG. 1, in at least some embodiments, overall score engine 102 may be provided a signal to generate scores (current and/or predicted) and optionally context information at any suitable times, for example periodically, at irregular intervals, or on demand by, for example, input from a user (e.g. request using a smartphone or web app), or a request from a system or component, for example control 104, or otherwise, that uses scores for generating or providing control to assets such as EVs. Such a system may include a computerized system used by a utility company for providing control to EV chargers used by utility customers. The computerized system could utilize a cloud-based application for enabling this functionality. In addition, overall score engine 102 may automatically push the signal directly to users and other systems, for instance using websockets, based on rules and triggers, for instance when the score (current or predicted) crosses a threshold.

In at least some embodiments, information relating to operations performed, and/or not performed, by assets 120, such as EVs 122, may be provided to control system 100. Such information may be considered feedback information. For example, charging events for EVs may be provided to the scoring engine models. Such information may be provided to system 100 for some or all users in a network so that system 100, for example models such as score generators, may learn of the operations or lack thereof that are performed in response to score or other control information, and optionally determine likely responses in the future. In aggregate, such feedback information enables a score generator to, for example, generate scores accounting for predicted behavior of users, or to modify accordingly scores for individual users based on previous feedback information. In areas where EV penetration is high, meaning a number or proportion of EVs is relatively high, and EV charging is likely to be a significant portion of load in a power grid, an aggregate behavior for all users may be used to determine the scores provided over a period of time that will best optimize, or otherwise improve on, the system to meet objectives, for example, of reducing emissions overall within grid constraints. For example, charging of one or more EVs may be scheduled to, for example maximize an average score during EV charging, while at the same time satisfying grid constraints (for example avoiding load peaks exceeding a defined level) and/or user constraints or preferences (for example a preference or requirement that their EV be charged to at least 80% battery state of charge by 8:00 am the next day). The scores may then be tailored to provide an optimal predicted response from the users based on both their local conditions and the system as a whole. For example, if it is likely that all EVs in a neighborhood would be likely to charge at 6 pm when the system is predicted to use a low emission energy mix, the scores may be modified to avoid all EVs charging at same time and thereby overload the transformer supplying the neighborhood.

In at least some embodiments, generating EV charging schedule information comprises scheduling charging of at least one EV to optimize one or more overall scores associated with one or more time periods during which the charging is scheduled to occur. The optimizing may seek the one or more overall scores favoring higher suitability for charging. For example, where a high score is associated with higher suitability, the optimization may maximize the one or more scores. Where a low score is associated with higher suitability, the optimization may minimize the one or more scores. Optimizing one or more scores may involve optimizing an average of all of the scores. In another embodiments, optimizing may involve optimizing one or more scores during each of one or more time periods.

Controller 104 may be configured with one or more suitable objectives. Example objectives may relate to one or more of minimizing or reducing emissions associated with power used for operations of the assets such as EV charging, power supply and demand balancing in a power system, peak or load shifting or shaving in a power system, and so on. Decision variables associated with an objective may relate to the scheduling of operations of one or more assets, for example charging of EVs, which may relate to charging start and stop dates and times, and charging rates. An optimization may optimize for one or more objectives by scheduling charging of one or more EVs while taking into account the charging flexibility of the EVs.

In an embodiment, a control system according to the present disclosure may implement receding-horizon control or optimization. For example, controller 104 may generate control information for a single interval or point in time, where the generating control information may include performing or more optimizations. In another embodiment, the system may involve a receding-horizon control scheme. In receding-horizon, which may utilize predictions, the decision variable values may be planned for each point in time or time interval in a horizon into the future, referred to as a control horizon. The horizon may start with the current point in time or time interval in the operation of the system, whose decision variable(s) are the only ones taken to perform an action in the system because they pertain to its current state and what is currently feasible. Such control operations or optimizations may be repeated with each subsequent point in time or time interval, making use of new knowledge of the updated situation for which the control is generated or optimization is performed, such as a more accurate prediction or an observed value instead of a predicted one. Receding-horizon control allows for planning ahead, such as by planning charging-related actions in the near future.

In at least some embodiments, generating an overall score comprises generating predicted overall scores for each of a plurality of time intervals in a time horizon.

The components of control systems according to the present disclosure, including system 100, may be implemented at more than one computing device. In such embodiments, components of a control system may communicate with one another in any suitable way, for example, over one or more suitable communication mediums, such as communications channels, connections, networks, shared memory resources, and so on, which may be wired and/or wireless, and which may include the Internet. In addition, the lines in the figures generally representing communications are only examples and are not limiting. Components and systems shown without lines connecting them may nonetheless communicate with one another.

Figure 3:
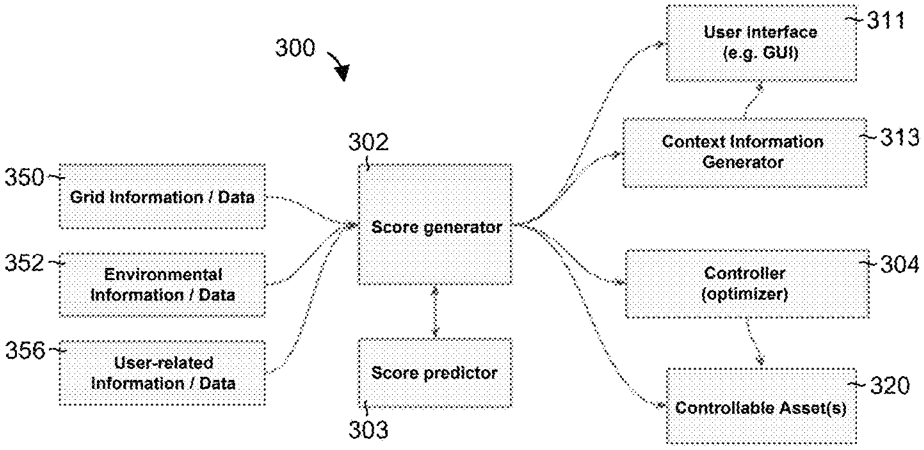
FIG. 3 is a block diagram of an example control system.

FIG. 3 is a block diagram of an example control system 300 according to the present disclosure. FIG. 3 is similar in some regards to the system 100 of FIG. 1, whereas FIG. 3 is more simplified. Accordingly, features described in relation to FIG. 1 generally apply to FIG. 3 but are not repeated in relation to FIG. 3. System 300 comprises an overall score generator 302 for generating one or more overall scores, and may compromise a score predictor 303 for generated scores that are predicted for one or more future time periods. Score generator 302 may comprise an AI or ML based score generating engine, and may generate overall scores for one or more particular regions. In addition, score generator 302 may generated scores that are specific to specific users, for example where the scores are adjusted based on information specific to each of the users. In addition, system 300 may comprise a controller 304, which may include one or more optimizers, for generating control information for providing control in relation to one or more EVs or other assets or systems. Controller 304 may acquire and generate control information based on at least current and/or predicted score information. Similar to score generator 302, score predictor 304 may comprise an AI or ML based score predictor, and may generate predicted scores for one or more particular regions, and/or predicted scores that are specific to specific users.

System 300 may receive information or data of any suitable types and from any suitable sources, for example information relating to one or more of power grid information 350, environmental information 352, and user-related information 356. Although the lines show the various information 350, 352, 356 being provided to score generator 302, this is not limiting and information may be provided directly to score predictor 304 or to any other part of system 300.

Generated score information, whether current and/or predicted, may be provided to a computing device having a user interface 311, such as a GUI, for outputting the score information. In addition, user interface 311 may comprise functionality, such as buttons or other input items for enabling user input of any kinds, for example to trigger one or more actions, such as starting or stopping charging, scheduling charging, and so on. System 300 may further include a context information generator 313 to generate or provide context information relating to scores or control information. Context information may be provided to the computing device having a user interface 311 for outputting to users.

Figure 4:
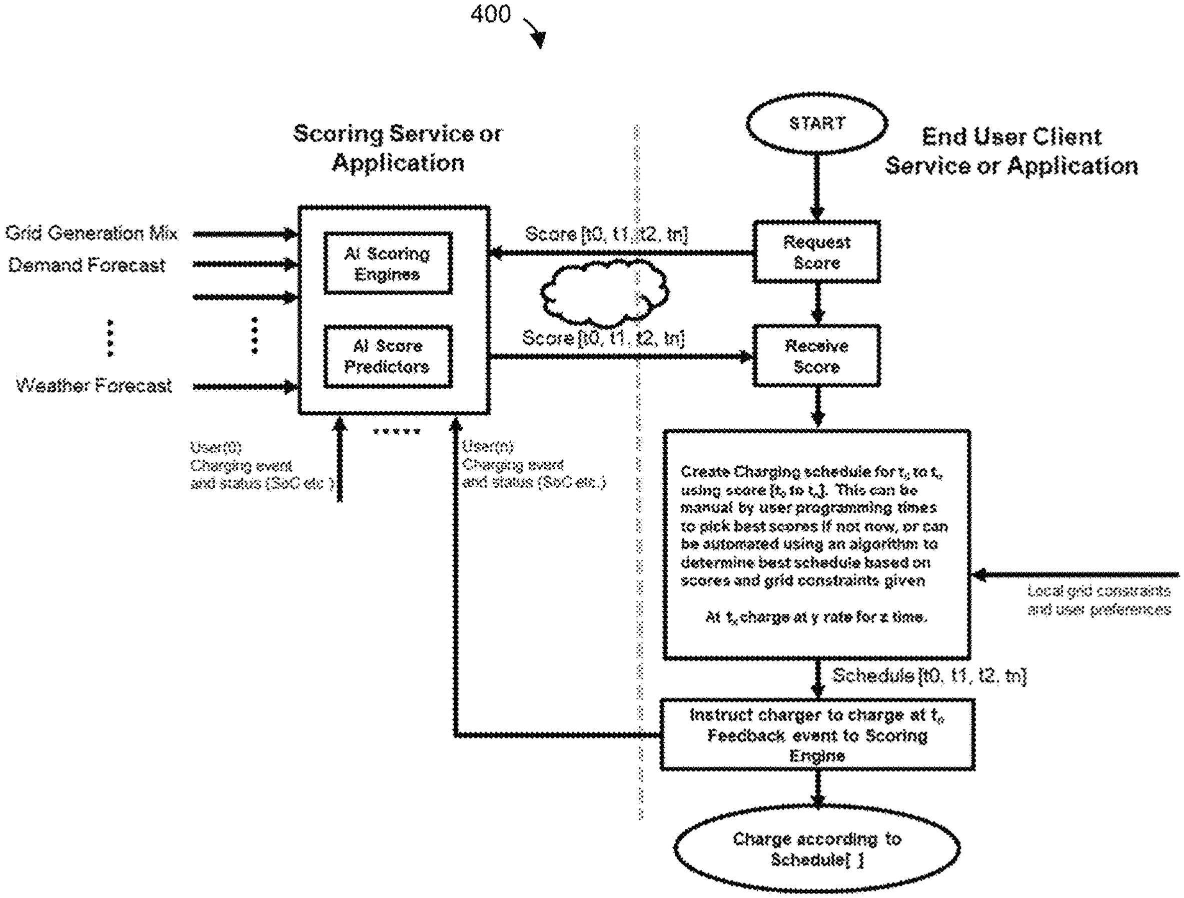
FIG. 4 is a block diagram of another example control system.

FIG. 4 is a block diagram of another example control system 400 according to the present disclosure.

FIG. 2 is a diagram of an example power grid 200. The term "power grid" as used herein generally refers to any power grid or power system that involves the distribution of electrical power. A power grid 200 may include a network for transmission and distribution from one or more power sources to end customers. In addition, a power grid may refer to all or part of any power system, a large power system, a small power system, and so on. In general, the terms power system and power grid are used interchangeably herein. Furthermore, a power grid generally refers to any power network or system, and is thus not limited to a conventional power grid. A power grid may be subdivided into several subgrids, subsystems or subsets or subregions.

Power grid 200 may comprise sub grids, for example a power transmission grid 204 and a power distribution grid 206. A power grid generally comprises one or more power generating plants 208, power transmission infrastructure 210 to carry power long distances, and power distribution infrastructure 212 to deliver power to end customers. Power generating plants 208 may include any types of power generation, such as fossil fuel such as coal or gas, nuclear, and renewables such as solar, wind, and so on. Power distribution infrastructure 212 may include one or more substations or entrance transformers 214, for example for stepping down the voltage from the transmission infrastructure to a lower voltage for the distribution infrastructure. In addition, there may be power generation systems 208 within power distribution grid 206. Power distribution infrastructure 212 may include one or more feeder transformers 216 and one or more distribution transformers 218 which may further step down the voltage from the feeder transformers 216 to a lower voltage, for example for delivery to end customers 220.

EVs 222 may be associated with the customers 220. Customers 220 may be associated with any type(s) of power consumer, for example a home or other building or dwelling, a charging station, a charge point, an EV, an energy storage system (ESS) such as a batter energy storage system (BESS) 224, and so on. Such ESSs may be behind the meter (BTM) devices. Customers 220 may include any other class of metered energy consumption point connected to the grid. In addition, there may be one or more sources of power generation 226 downstream in the distribution grid 206, for example renewable power sources at or connected to one or more of the homes or other buildings or premises of customers 220. Such power may be temporarily stored in ESSs 224.

Power grid 200 may generally include any types of energy sources, including a discharging ESS, and a discharging EV with vehicle-to capabilities, such as vehicle-to-everything (V2X) capabilities. V2X may include vehicle-to-grid (V2G).

Power grid 200 may have electrical meters 207, for example transmission meters, distribution meters, or customer meters, at various locations in the system 200. Meters may be used to measure any types of electrical parameters, such as current, voltage, power, and so on. Electrical measurements relating to the power grid may be used by one or more components according to the present disclosure.

Power grid 200 may include a tree like structure, such as distribution grid 206, which may be thought of as having multiple different branches, for example from a substation to various feeders, or from a feeder to various transformers, and so on.

The systems, methods, and so on according to the present disclosure may be used with any types of suitable power systems. For example, in an embodiment, a system according to the present disclosure may be implemented and used with a level similar to that of an overall electricity system, for example, at a similar level to Ontario's IESO (Independent Electricity System Operator) or the CAISO (California Independent System Operator). In addition, a system may be used with a distribution utility or within an individual network of a local electrical grid, or at any other level or combination of levels. In at least some embodiments, a system may be suitably applied to a higher-level electricity system rather than a distribution utility which is within the "last mile" of distributing power to consumers.

Traditionally, power flows from top to bottom in an electricity system, starting from generating stations or power plants connected to the transmission grid or directly to a local distribution grid, then typically flowing through a city entrance transformer to be delivered to industrial consumers and via feeder entrance and street level transformers to commercial and residential consumers. More and more frequently, industrial, commercial, and residential consumers are setting up microgrids and/or net metering to be considered as electricity producers as well (for example with solar, wind, ESSs, and V2X). Furthermore, ESSs may be implemented alongside pieces of electrical infrastructure (for example feeder entrance transformers, as shown above) to do peak shifting/shaving, thereby protecting or prolonging the grid infrastructure. Examples of such ESSs 228 are shown in FIG. 2, which may front of meter (FOM) ESSs.

An electricity system such as power grid 200 represents a variety of assets and opportunities to control some of the assets, particularly given the increasing prevalence of EVs. However, such optimization and control is typically subject to the constraints imposed by entities such as customers, users, power system operators, assets such as transmission and distribution power lines, transformers of various sizes, utility and distribution company assets, commercial EVs and EV charging hardware, and other pieces of electrical infrastructure. Additionally, the optimization and control of the power system or assets associated with the power system may be limited, for example by the availability of a given EV's ability for charging, charging curtailment, or discharge at a given point or period in time. A power system often attempts to balance its total supply to match its total demand as best as possible. In addition, a power system may generally attempt to perform this balancing in a way that attempts to protect and prolong the life of its electrical infrastructure.

Optimizations may be performed in relation to a given level in a power system, for example at a level of a street level transformer within a neighborhood network, up to a system-wide implementation meaning at the top level of the power system. Thus, the term "system-wide" generally refers to doing something at the top level of a system. In addition, other optimization objectives are possible and contemplated.

The resolution of system's inputs, outputs, and constraints to a power control system may be arbitrary. For example, if implemented for an overall power system, inputs such as electricity demand and constraints such as limits on the electricity demand may be broken down at the level of individual networks in the transmission or distribution grids, or may be aggregated. However, in at least some embodiments, more granular resolutions may generally be better.

Figure 5:
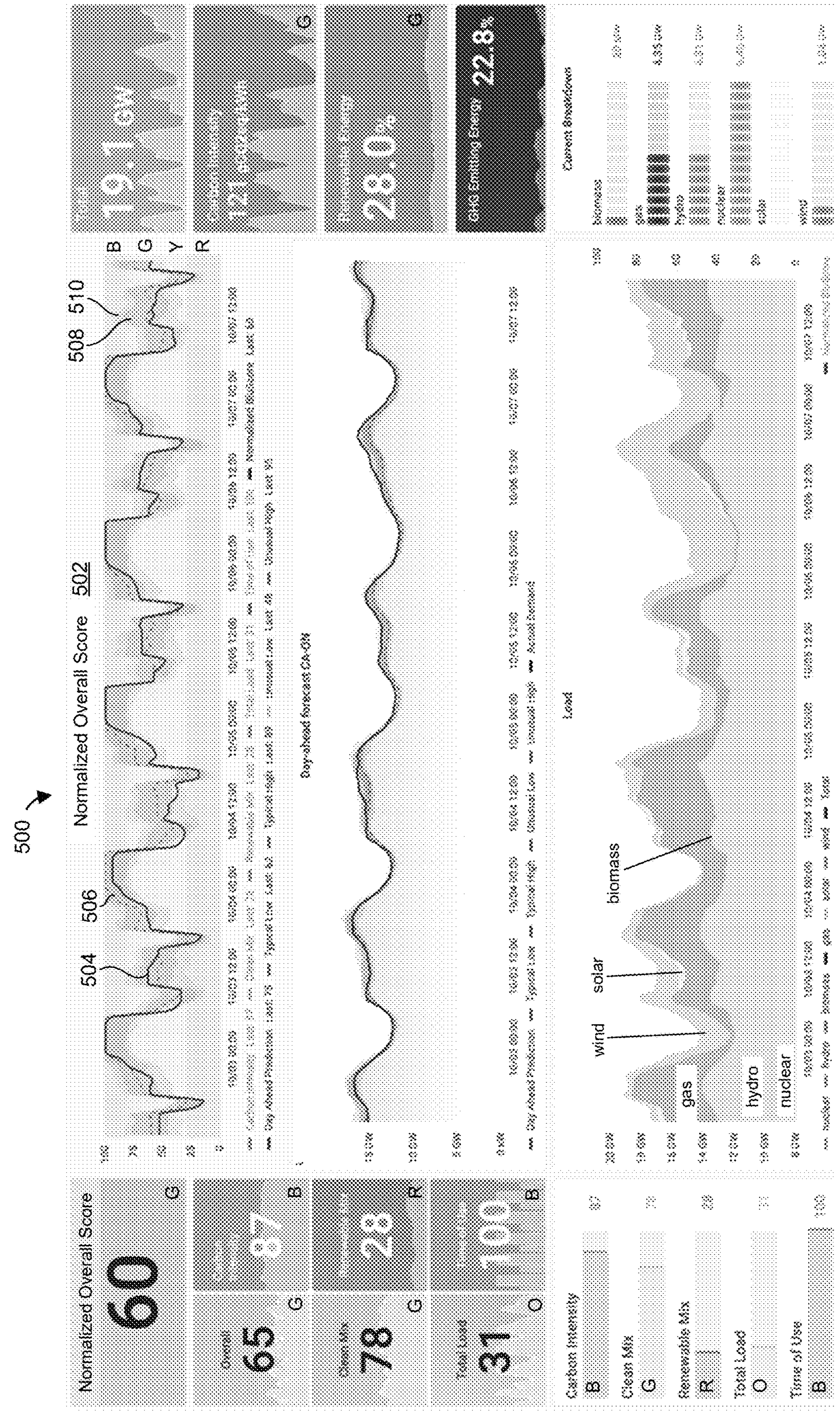
FIG. 5 is an example GUI 500 of a dashboard.

FIG. 5 is an example GUI 500 of a dashboard according to the present disclosure. The dashboard may display various types of information. For example, score information is indicated as a normalized overall score.

In this simplified example, input data may include one or more of the following for the province of Ontario, Canada, which is considered the region: load in the system (current, historical), energy supply mix (current and historical), including renewable energies (for example wind/solar/hydro/biomass), carbon content of the energy supply (current and historical), GHG Emissions of the energy supply, time-of-use electricity prices, and so on.

Subscores are generated for power grid information (for example load in the grid—"Total Load"—subscore 31), environmental information (for example, "Carbon Intensity"—subscore 87, "Clean Mix" of power—subscore 78, "Renewable Mix" of power—subscore 28), and business information (for example "Time-of-use" electricity price information-subscore 100).

An overall score generator generates overall score information 502 based on at least the subscores, for example using a combination of one or more of heuristics, LGBM algorithm and weighted average ensembler.

In the overall score information 502, current overall score information 504 is shown in a solid line, while predicted overall score information 506 is shown in a dashed line. At a given point in time on the graph 502, an overall score may be the current score, while the shown predicted overall score may be the score that was predicted for the point in time at a previous time. Shaded areas correspond to confidence intervals calculated using the Model Agnostic Prediction Interval Estimator algorithm (dark shaded area 508: one standard deviation, light shaded area 510: 2 standard deviations). FIG. 6 is a zoomed-in view of normalized overall score 502.

The dashboard shows various other types of information, including total load in the grid (19.1 GW), total carbon intensity, total percentage of renewable energy of all energy in the grid, total percentage of emission emitting energy in the grid, and breakdown of energy by generation source (biomass, gas, hydro, nuclear, solar, wind).

In at least some aspects, the present disclosure provides improvements to power system and electrical asset control technologies. In at least some embodiments, improvements are provided by providing control in relation to operations of one or more EVs or other assets. The providing control may comprise generating an overall score, for example for a time interval, based on information such as power grid information and/or environmental emissions information. The overall score may indicate a level of suitability for charging an EV during the time interval. A higher suitability is associated with a lower quantity of environmental emissions. The providing control may further comprise generating control information based on the overall score, wherein the control information comprises EV charging schedule information. By generating scores and/or utilizing scores to generate control information, the present disclosure provides more efficient and/or effective control and management of electric power systems and electric assets, such as EVs, thereby providing improvements in EV and other asset control technologies. Further improvements may include influencing or controlling EV charging to use more power generated by renewable or lower emissions sources; reducing need and usage of on-demand power generation sources, which are often generate higher emissions; shifting consumption away from on-peak times to off-peak times, possibly reducing or avoiding peak in demand in a power grid; and so on.

In at least some embodiments, systems and methods according to the present disclosure provide a clear and easy to understand score indicating the suitability of performing an operation at a particular time, for example a suitability for charging an EV. Score information may be provided to computing devices that trigger actions based on the score information, for example to provide at least some automatic control of operations of the EV based on the score information. The score information may arm consumers, drivers, utilities, automotive OEMs, charging service providers, and other entities or persons with information enabling them to improve control over the operation of EVs and other assets, including reducing the consumption of power that was generated with higher emissions.

In addition, in some embodiments, score information enables stakeholders to provide rewards and incentives to consumers through app participation and to provide shifting charging behavior to benefit the grid and to reduce emissions. In aggregation, this supports a utility company by moving demand to periods where more renewable generation is available, effectively shifting and mitigating peaks while relying less on dispatchable thermal energy. This provides abilities to use lower cost renewable energy, providing savings that can be passed to consumers. In addition, it provides abilities for utilities and system operators to defer or reduce the need to build more generation, transmission and distribution capacity. In addition, this helps educate users to modify behavior and in addition to rewards (for example discounted energy prices, financial rewards or points for gifts, etc.), it aligns with social goals and provides a mechanism to show individuals and organizations they are providing a benefit contributing to reduction in emissions and demonstrate "green" behavior.

Figure 10:
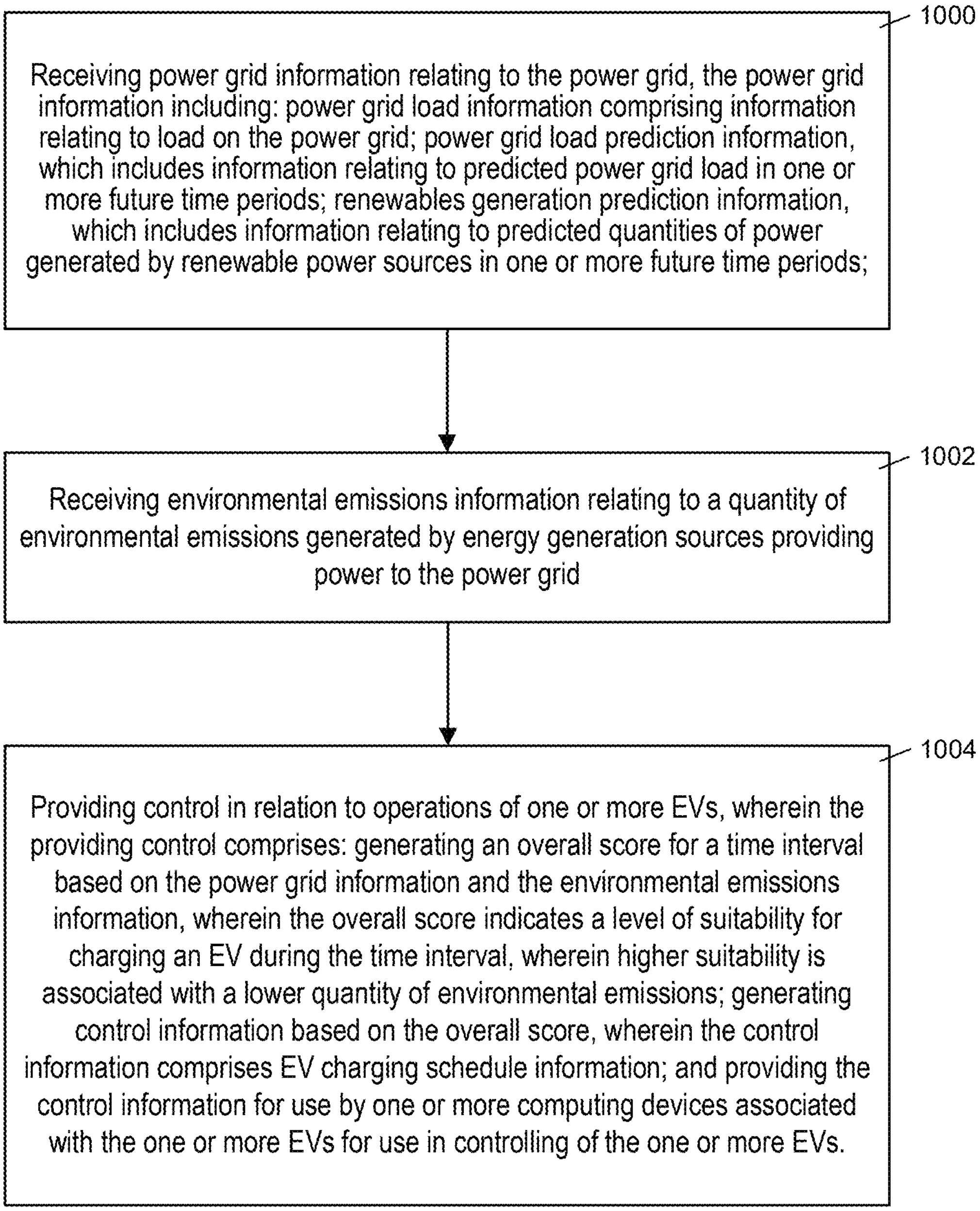
FIG. 10 is a process flow diagram of an example method.

FIG. 10 is a process flow diagram of an example method. The example method may be performed at or by one or more electronic devices each having one or more computer processors and computer-readable memory. The method may provide control in relation to one or more EVs or other electrical assets.

At block 1000, the method comprises receiving power grid information relating to the power grid. The method may be performed at one or more electronic devices each having one or more processors and computer-readable memory to provide control in relation to operations a plurality of electric vehicles (EVs) associated with a power grid. The power grid information may include one or more of: power grid load information comprising information relating to load on the power grid; power grid load prediction information, which includes information relating to predicted power grid load in one or more future time periods; renewables generation prediction information, which includes information relating to predicted quantities of power generated by renewable power sources in one or more future time periods.

At block 1002, the method comprises receiving environmental emissions information relating to a quantity of environmental emissions generated by energy generation sources providing power to the power grid.

At block 1004, the method comprises providing control in relation to operations of one or more EVs. The providing control may comprise one or more of: generating an overall score for a time interval based on the power grid information and the environmental emissions information, wherein the overall score indicates a level of suitability for charging an EV during the time interval, wherein higher suitability is associated with a lower quantity of environmental emissions; generating control information based on the overall score, wherein the control information comprises EV charging schedule information; and providing the control information for use by one or more computing devices associated with the one or more EVs for use in controlling of the one or more EVs.

Some features and embodiments may be described with EVs having drivers. A driver may be a human but may alternatively be a computing system, or some combination of both. Thus, references to a "driver" are not necessarily limited to humans, but may refer to a computing system capable of driving or operating a vehicle. In addition, some features are described as being received from, outputted to, or otherwise relating to, a "driver". However, this is not meant to be limiting and generally includes other persons other than drivers.

In the present disclosure, the term 'charger' generally refers to electric vehicle supply equipment (EVSE). The term 'connector' is generally used to refer a physical interface of EVSE that connects the EVSE with an EV. The term 'charger' is used herein to generally refer to a single EVSE, which may have one or more connectors.

An EV may be a car or any other type of electric vehicle, such as an electric boat or aircraft. As such, the present disclosure applies equally to, for example, electric uncrewed aerial vehicles (UAVs; "drones") such as what might be used to deliver goods or supplies such as medicine throughout a region. Furthermore, an EV may be a traditional EV, but the term also includes plug-in hybrid EVs (PHEVs), fuel-cell EVs (FCEVs), and any other type of technology of vehicle whose energy may be resupplied via electricity.

The teachings according to the present disclosure may be applied and implemented in various different fields and applications. For example, the present disclosure applies to dispatchable loads, for example in residential settings or commercial buildings. These are other sources of demand that may be controlled by consumers themselves, or via a utility, or via an energy aggregator. This may include, for example, electric HVAC devices and systems, heat pumps, storage heaters, or battery energy storage including in residential homes. Another example application may include power grid attached energy storage. Energy may be stored in ESSs, which may include utility scale storage for example at substations, or large scale storage, for example at a transmission or distribution level in a power grid. Another example application may include with dispatchable loads or DERs connected to sites that service EV fleets, for example municipal, institutional, commercial, or industrial fleets.

In some embodiments, algorithms, techniques, and/or approaches according to the present disclosure may be performed or based on artificial intelligence (AI) algorithms, techniques, and/or approaches. This includes but is not limited to score generators, controllers, predictors and/or optimizers according to the present disclosure, as well as controlling of EVs or other controllable assets or systems, for example EV charging architecture, EV chargers, and so on.

In some embodiments, the AI algorithms and techniques may include machine learning techniques.

Machine Learning (ML) may be used in one or more aspects of a control system according to the present disclosure. Machine learning systems or models may be used to predict any suitable types of information, for example mixes of sources of power generation, amounts of emissions produced by power generation including by various types of generation sources, load in a grid, energy prices, weather information, traffic information, power availability (for example from a grid or renewable sources), customer demand, electricity demand, and so on. Machine learning models may be used to generate scores and subscores, generate control information for providing control in relation to assets in a system, for instance using one or more optimizations.

A machine learning algorithm or system may receive data, for example historical data, streaming controllable asset data, environmental data, and/or third party data, and, using one or more suitable machine learning algorithms, may generate one or more datasets. Example types of machine learning algorithms include but are not limited to supervised learning algorithms, unsupervised learning algorithms, reinforcement learning algorithms, semi-supervised learning algorithms (for example where both labeled and unlabeled data is used), regression algorithms (for example logistic regression, linear regression, and so forth), regularization algorithms (for example least-angle regression, ridge regression, and so forth), artificial neural network algorithms, instance based algorithms (for example locally weighted learning, learning vector quantization, and so forth), Bayesian algorithms, decision tree algorithms, clustering algorithms, and so forth. Further, other machine learning algorithms may be used additionally or alternatively. In some embodiments, a machine learning algorithm or system may analyze data to identify patterns and/or sequences of activity, and so forth, to generate one or more datasets.

A control system according to the present disclosure may comprise one or more control policies. The control policies of the system may be based on trained machine learning based systems. In this sense, a control policy may be part of a controller or control agent. A control agent observes its environment, which may be referred to as a control environment, and takes action based on its observations, or percepts, of the control environment. The taking of action is referred to as controlling the system. Depending on the state of the environment, taking action may involve taking no action at all with respect to the system outputs, for example if there has been little or no change in the state since the last time the agent took action. Thus, doing nothing (not updating any setpoints, etc.) is a valid action in a set of actions in the action space of the controller. In an embodiment, the present systems and methods may exploit the flexibility of controllable assets in the system to achieve improved performance of the system. For example, the flexibility of controllable assets may be exploited in response to changes in the control environment.

In an embodiment, online machine learning may be employed. Online machine learning is a technique of machine learning where data becomes available sequentially over time. The data is utilized to update a predictor for future data at each step in time (for example time slot). This approach of online machine learning may be contrasted to approaches that use batch learning wherein learning performed on an entire or subset of training data set. Online machine learning is sometimes useful where the data varies significantly over time, such as in power or energy pricing, commodity pricing, and stock markets. Further, online machine learning may be helpful when it is not practical or possible to train the agent over the entirety or a subset of a data set.

In embodiments according to the present disclosure, training of a machine learning system, such as a score generator, controller, predictor, optimizer, or scheduler, may be based on offline learning and/or online learning where streaming real-time data may be combined with at least some data, for example from a database to train the machine learning system in real-time or near real-time. Over time, a machine learning system may be retrained, for example with newer or different training data.

Figure 11:
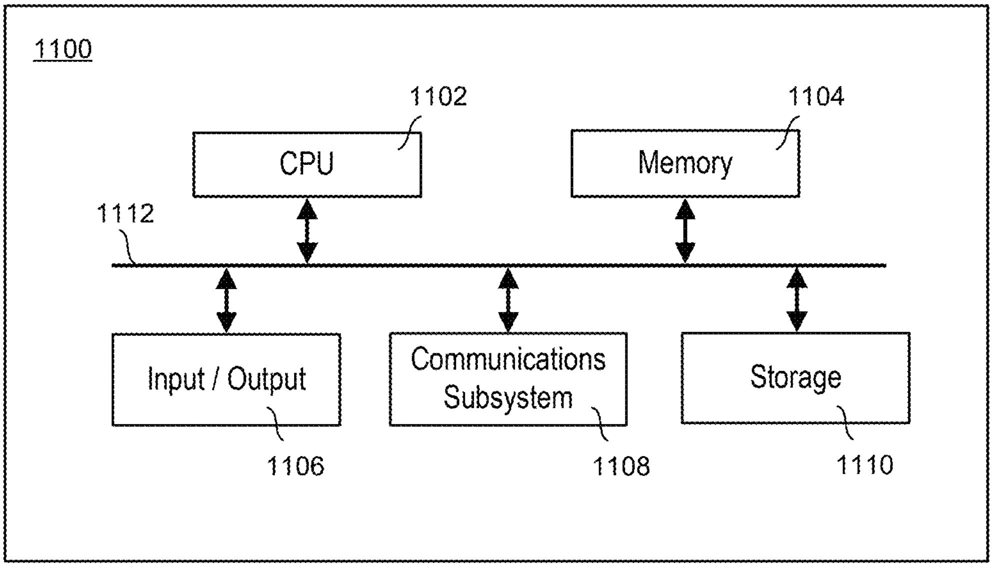
FIG. 11 is a block diagram of an example computerized device or system.

FIG. 11 is a block diagram of an example computerized device or system 1200 that may be used in implementing one or more aspects or components of an embodiment according to the present disclosure. For example, system 1100 may be used to implement a computing device or system, such as a control system (for example systems 100, 300, 400), a controller (for example controller 104), an optimizer (for example controller with optimizer 104), a score generator (for example 118*a*-*c*, 102, 303), a predictor (for example subscore predictors 118*a*-*c*), and so on, to be used with a device, system or method according to the present disclosure. Thus, one or more systems 1100 may be configured to implement one or more portions of the systems or apparatuses or methods according to the present disclosure. System 1100 may be used to implement a system comprising a computer-readable storage medium having executable instructions, and one or more computer processors configured to execute the instructions to provide control in relation to operations a plurality of EVs associated with a power grid.

Computerized system 1100 may comprise one or more of classic, analog, electronic, digital, and quantum computing technologies. Computerized system 1100 may include one or more of a computer processor device 1102, memory 1104, a mass storage device 1110, an input/output (I/O) interface 1106, and a communications subsystem 1108. A computer processor device may be any suitable device(s), and encompasses various devices, systems, and apparatus for processing data and instructions. These include, as examples only, one or more of a hardware processor, a digital processor, an electronic processor, a quantum processor, a programmable processor, a computer, a system on a chip, and special purpose logic circuitry such as an ASIC (application-specific integrated circuit) and/or FPGA (field programmable gate array). In addition, system 1100 may include hardware dedicated to one or more specific purposes, such as a graphics processing unit (GPU), or a tensor processing unit (TPU) or other artificial intelligence accelerator ASIC, for example for ML.

Memory 1104 may be configured to store computer readable instructions, that when executed by processor 1102, cause the performance of operations, including operations in accordance with the present disclosure.

One or more of the components or subsystems of computerized system 1100 may be interconnected by way of one or more buses 1112 or in any other suitable manner.

The bus 1112 may be one or more of any type of several bus architectures including a memory bus, storage bus, memory controller bus, peripheral bus, or the like. The processor 1102 may comprise any type of electronic data processor. The memory 1104 may comprise any type of system memory such as dynamic random access memory (DRAM), static random access memory (SRAM), synchronous DRAM (SDRAM), read-only memory (ROM), a combination thereof, or the like. In an embodiment, the memory may include ROM for use at boot-up, and DRAM for program and data storage for use while executing programs.

The mass storage device 1110 may comprise any type of storage device configured to store data, programs, and other information and to make the data, programs, and other information accessible via the bus 1112. The storage device may be adapted to store one or more databases and/or data repositories, each of which is generally an organized collection of data or other information stored and accessed electronically via a computer. The term database or repository may thus refer to a storage device comprising a database. The mass storage device 1110 may comprise one or more of a solid state drive, hard disk drive, a magnetic disk drive, an optical disk drive, or the like. In some embodiments, data, programs, or other information may be stored remotely, for example in the cloud. Computerized system 1100 may send or receive information to the remote storage in any suitable way, including via communications subsystem 1108 over a network or other data communication medium.

The I/O interface 1106 may provide interfaces for enabling wired and/or wireless communications between computerized system 1100 and one or more other devices or systems, such as control system according to the present disclosure. Furthermore, additional or fewer interfaces may be utilized. For example, one or more serial interfaces such as Universal Serial Bus (USB) (not shown) may be provided. Further, system 1100 may comprise or be communicatively connectable to a display device, and/or speaker device, a microphone device, an input device such as a keyboard, button, pointer, mouse, touch screen display, microphone, camera, scanner, or any other type of input device.

Computerized system 1100 may be used to configure, operate, control, monitor, sense, and/or adjust devices, systems, and/or methods according to the present disclosure.

A communications subsystem 1108 may be provided for one or both of transmitting and receiving signals over any form or medium of digital data communication, including a communication network. Examples of communication networks include a local area network (LAN), a wide area network (WAN), telecommunications network, cellular network, an inter-network such as the Internet, and peer-to-peer networks such as ad hoc peer-to-peer networks. Communications subsystem 1108 may include any component or collection of components for enabling communications over one or more wired and wireless interfaces. These interfaces may include but are not limited to, USB, Ethernet (for example IEEE 802.3), high-definition multimedia interface (HDMI), Firewire™ (for example IEEE 1374), Thunderbolt™, WiFi™ (for example IEEE 802.11), WiMAX (for example IEEE 802.16), Bluetooth™, or Near-field communications (NFC), as well as General Packet Radio Service (GPRS), Universal Mobile Telecommunications System (UMTS), Long-Term Evolution (LTE), LTE-A, 5G NR (New Radio), satellite communication protocols, and dedicated short range communication (DSRC). Communication subsystem 1108 may include one or more ports or other components (not shown) for one or more wired connections. Additionally or alternatively, communication subsystem 1108 may include one or more transmitters, receivers, and/or antenna elements (none of which are shown). Further, system 1100 may comprise clients and servers.

Computerized system 1100 of FIG. 11 is merely an example and is not meant to be limiting. Various embodiments may utilize some or all of the components shown or described. Some embodiments may use other components not shown or described but known to persons skilled in the art.

A system according to the present disclosure may be implemented in hardware and/or software, for example as a system operating at least partly in the cloud, for example in a server role, with remote clients (such as computing devices associated with users, EVs, other assets, for example smartphones, personal computers, edge computing devices, vehicles, appliances, and so on) being served by the system. Software applications implementing aspects of the present disclosure may be configured to run locally or embedded on one or more computing devices (for example a computing server, smartphone, personal computer, edge computing device, vehicles, appliances, and so on). In at least some embodiments, a system comprises parts of the system implemented on one or more servers, possibly in the cloud, and parts of the system running on client side computing devices.

One or more operations or steps according to the present disclosure may be performed automatically, meaning without any human intervention, by one or more computing devices.

Logical operations of the various embodiments according to the present disclosure may be implemented as (i) a sequence of computer implemented steps, procedures, or operations running on a programmable circuit in a computer, (ii) a sequence of computer implemented operations, procedures, or steps running on a specific-use programmable circuit; and/or (iii) interconnected machine modules or program engines within the programmable circuits. The computerized device or system 1100 of FIG. 11 may practice all or part of the recited methods or operations, may be a part of systems according to the present disclosure, and/or may operate according to instructions in computer-readable storage media. Such logical operations may be implemented as modules configured to control a computer processor, such as processor 1102, to perform particular functions according to the programming of the module. In other words, a computer processor, such as processor 1102, may execute the instructions, steps, or operations according to the present disclosure, including of the one or more of the blocks or modules. For example, one or more of the modules or blocks in the present figures, for example, FIGS. 1, and 3-4 may be configured to control processor 1102. For example, the modules or blocks in FIGS. 1, 3-4 may include but are not limited to, for example, control systems 100, 300, 400, optimizers, predictors, and so on. At least some of these blocks or modules may be stored on storage device 1110 and loaded into memory 1104 at runtime or may be stored in other computer-readable memory locations.

The concepts of real-time and near real-time may be defined as providing a response or output within a predetermined time interval, usually a relatively short time. A time interval for real-time is generally shorter than an interval for near real-time. Mere non-limiting examples of predetermined time intervals may include the following as well as values below, between, and/or above these figures: 10 s, 60 s, 5 min, 10 min, 20 min, 30 min, 60 min, 2 hr, 4 hr, 6 hr, 8 hr, 10 hr, 12 hr, 1 day.

The term module used herein may refer to a software module, a hardware module, or a module comprising both software and hardware. Generally, software includes computer executable instructions, and possibly also data, and hardware refers to physical computer hardware.

The term 'data' generally refers to raw or unorganized facts whereas 'information' generally refers to processed or organized data. However, the terms are generally used synonymously herein unless indicated otherwise.

Embodiments, components, subsystems, and operations according to the present disclosure may be implemented in digital electronic circuitry, and/or in computer software, firmware, and/or hardware, including structures according to this disclosure and their structural equivalents. Embodiments and operations according to the present disclosure may be implemented as one or more computer programs, for example one or more modules of computer program instructions, stored on or in computer storage media for execution by, or to control the operation of, one or more computer processing devices such as a processor.

Operations according to the present disclosure may be implemented as operations performed by one or more processing devices on data stored on one or more computer-readable storage devices or media, and/or received from other sources.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not necessarily provided as to whether the embodiments described herein are implemented as a computer software, computer hardware, electronic hardware, or a combination thereof.

In at least some embodiments, one or more aspects or components may be implemented by one or more special-purpose computing devices. The special-purpose computing devices may be any suitable type of computing device, including desktop computers, portable computers, handheld computing devices, networking devices, or any other computing device that comprises hardwired and/or program logic to implement operations and features according to the present disclosure.

Embodiments of the disclosure may be represented as a computer program product stored in a machine-readable medium (also referred to as a computer-readable medium, a processor-readable medium, or a computer usable medium having a computer-readable program code embodied therein). The machine-readable medium may be any suitable tangible, non-transitory medium, including magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations may also be stored on the machine-readable medium. The instructions stored on the machine-readable medium may be executed by a processor or other suitable processing device, and may interface with circuitry to perform the described tasks.

The structure, features, accessories, and/or alternatives of embodiments described and/or shown herein, including one or more aspects thereof, are intended to apply generally to all of the teachings of the present disclosure, including to all of the embodiments described and illustrated herein, insofar as they are compatible. Thus, the present disclosure includes embodiments having any combination or permutation of features of embodiments or aspects herein described.

In addition, the steps and the ordering of the steps of methods and data flows described and/or illustrated herein are not meant to be limiting. Methods and data flows comprising different steps, different number of steps, and/or different ordering of steps are also contemplated. Furthermore, although some steps are shown as being performed consecutively or concurrently, in other embodiments these steps may be performed concurrently or consecutively, respectively.

For simplicity and clarity of illustration, reference numerals may have been repeated among the figures to indicate corresponding or analogous elements. Numerous details have been set forth to provide an understanding of the embodiments described herein. The embodiments may be practiced without these details. In other instances, well-known methods, procedures, and components have not been described in detail to avoid obscuring the embodiments described.

The embodiments according to the present disclosure are intended to be examples only. Alterations, modifications and variations may be effected to the particular embodiments by those of skill in the art without departing from the scope, which is defined solely by the claims appended hereto.

Terms such as "comprising", "comprises", "including," "includes," "having," "has," "with," and variants thereof as used herein generally mean includes but not necessarily limited to. The terms "a" or "an" are generally used to mean one or more than one. Furthermore, the term "or" is used in a non-exclusive manner, meaning that "A or B" includes "A but not B," "B but not A," and "both A and B" unless otherwise indicated. In addition, the terms "first," "second," and "third," and so on, are used only as labels for descriptive purposes, and are not intended to impose numerical requirements or any specific ordering on their objects.

The following example clauses describe further example aspects, embodiments, and/or features according to the present disclosure. While the clauses describe systems, they are intended and thus include corresponding methods and corresponding non-transitory computer-readable media having computer-readable instructions stored thereon.

Clause 1. A system, comprising: a computer-readable storage medium having executable instructions; and one or more computer processors configured to execute the instructions to provide control in relation to operations a plurality of electric vehicles (EVs) associated with a power grid, the instructions to: receive power grid information relating to the power grid, the power grid information including: power grid load information comprising information relating to load on the power grid; power grid load prediction information, which includes information relating to predicted power grid load in one or more future time periods; renewables generation prediction information, which includes information relating to predicted quantities of power generated by renewable power sources in one or more future time periods; receive environmental emissions information relating to a quantity of environmental emissions generated by energy generation sources providing power to the power grid; and provide control in relation to operations of one or more EVs, wherein the providing control comprises: generating an overall score for a time interval based on the power grid information and the environmental emissions information, wherein the overall score indicates a level of suitability for charging an EV during the time interval, wherein higher suitability is associated with a lower quantity of environmental emissions; generating control information based on the overall score, wherein the control information comprises EV charging schedule information; and providing the control information for use by one or more computing devices associated with the one or more EVs for use in controlling of the one or more EVs.

Clause 2. A system according to any one of the other clauses, wherein the generating control information comprises performing an optimization to generate the EV charging schedule information.

Clause 3. A system according to any one of the other clauses, wherein a higher score indicates lower environmental emissions, and generating the control information comprises optimizing the EV charging schedule information to maximize scores.

Clause 4. A system according to any one of the other clauses, wherein the providing control is further based on one or more of: business information, user-related information, and predicted power grid information relating to the power grid at one or more future time intervals.

Clause 5. A system according to any one of the other clauses, wherein the providing control in relation to operations of one or more EVs comprises triggering, in response to the control information, one or more physical actions relating to EV charging in relation to at least one of the EVs based on the control information, wherein the one or more physical actions comprise at least one of: starting charging of an EV, stopping charging of an EV, setting or adjusting a charging rate of charging for an EV.

Clause 6. A system according to any one of the other clauses, the instructions further to: receive electrical measurement data measured at one or more meters in the power grid, and wherein the providing control information is based at least on some of the measurement data, wherein the measurement data comprise data relating to one or more of voltage, current, and energy.

Clause 7. A system according to any one of the other clauses, the instructions further to: measure data at one or more meters in the power grid to acquire electrical measurement data, and wherein the providing control information is based at least on some of the measurement data.

Clause 8. A system according to any one of the other clauses, the instructions further to: receive feedback information associated with one or more specific EVs in response to prior control information, the feedback information comprising an indication of a level of compliance with the prior control information, and wherein the generating control information for a future time period is performed based on the feedback information.

Clause 9. A system according to any one of the other clauses, wherein the generating the overall score comprises: generating a power grid subscore based on the power grid information; generating an environmental subscore based on the environmental emissions information; and generating the overall score based on the power grid subscore and the environmental subscore using an ensemble process; and receiving input, and adjusting the ensemble process based on the received input, for example to allow the fine-tuning or other adjustment of the generating of the overall score.

Clause 10. A system according to any one of the other clauses, wherein the power grid information comprises grid topology information and electrical measurement information of the power grid.

Clause 11. A system according to any one of the other clauses, wherein the instructions are further to: receive business information comprising information relating to at least one of actual and predicted cost of power in a given time interval, wherein the generating the overall score is further based on the business information.

The invention claimed is:

1. A system, comprising:

a computer-readable storage medium having executable instructions; and one or more computer processors configured to execute the instructions to provide control in relation to operations a plurality of electric vehicles (EVs) associated with a power grid, the instructions to:

receive power grid information relating to the power grid, the power grid information including:

power grid load information comprising information relating to load on the power grid;

power grid load prediction information, which includes information relating to predicted power grid load in one or more future time periods;

renewables generation prediction information, which includes information relating to predicted quantities of power generated by renewable power sources in the one or more future time periods;

receive environmental emissions information relating to a quantity of environmental emissions generated by energy generation sources providing power to the power grid; and provide control in relation to operations of one or more EVs, wherein the providing control comprises:

generating an overall score for a time interval, wherein the time interval comprises at least one of a current time period and the one or more future time periods, based on the power grid information and the environmental emissions information, wherein the overall score indicates a level of suitability for charging an EV during the time interval, wherein higher suitability is associated with a lower quantity of environmental emissions;

generating control information based on the overall score, wherein the control information comprises EV charging schedule information and wherein the EV charging schedule information includes an indication to initiate charging of an EV when the overall score is above a predefined threshold; and providing the control information for use by one or more computing devices associated with the one or more EVs for use in controlling of the one or more EVs.

2. The system according to claim 1, wherein the generating the overall score comprises:

generating a power grid subscore based on the power grid information;

generating an environmental subscore based on the environmental emissions information; and generating the overall score based on the power grid subscore and the environmental subscore using an ensemble process.

3. The system according to claim 1, wherein at least one of the power grid load information and the power grid load prediction information comprises information relating to at least two different subsets of the power grid, and wherein the generating the overall score for the time interval comprises generating separate overall scores for each of the two subsets of the power grid.

4. The system according to claim 3, wherein the instructions are further to:
receive location information associated with an EV,
wherein the subset of the power grid for which the overall score is generated corresponds to the location information associated with the EV.

5. The system according to claim 1, wherein the generating overall score comprises generating predicted overall scores for each of a plurality of time intervals in a time horizon.

6. The system according to claim 1, wherein the generating overall score comprises generating context information associated with the overall score, the context information comprising a textual description relating to the overall score, and wherein the providing the control information includes providing the context information.

7. The system according to claim 1, wherein the providing control in relation to operations of one or more EVs comprises triggering, in response to the control information, one or more physical actions relating to EV charging in relation to at least one of the EVs.

8. The system according to claim 1, wherein generating EV charging schedule information comprises scheduling charging of at least one EV to optimize one or more overall scores associated with one or more time periods during which the charging is scheduled to occur, wherein the optimizing seeks the one or more overall scores favoring higher suitability for charging.

9. A method comprising:
at one or more electronic devices each having one or more processors and computer-readable memory, to provide control in relation to operations a plurality of electric vehicles (EVs) associated with a power grid:
receiving power grid information relating to the power grid, the power grid information including:
power grid load information comprising information relating to load on the power grid;
power grid load prediction information, which includes information relating to predicted power grid load in one or more future time periods;
renewables generation prediction information, which includes information relating to predicted quantities of power generated by renewable power sources in the one or more future time periods;
receiving environmental emissions information relating to a quantity of environmental emissions generated by energy generation sources providing power to the power grid; and
providing control in relation to operations of one or more EVs, wherein the providing control comprises:
generating an overall score for a time interval, wherein the time interval comprises at least one of a current time period and the one or more future time periods, based on the power grid information and the environmental emissions information, wherein the overall score indicates a level of suitability for charging an EV during the time interval, wherein higher suitability is associated with a lower quantity of environmental emissions;
generating control information based on the overall score, wherein the control information comprises EV charging schedule information and wherein the EV charging schedule information includes an indication to initiate charging of an EV when the overall score is above a predefined threshold; and
providing the control information for use by one or more computing devices associated with the one or more EVs for use in controlling of the one or more EVs.

10. The method according to claim 9, wherein the generating the overall score comprises:
generating a power grid subscore based on the power grid information;
generating an environmental subscore based on the environmental emissions information; and
generating the overall score based on the power grid subscore and the environmental subscore using an ensemble process.

11. The method according to claim 9, wherein at least one of the power grid load information and the power grid load prediction information comprises information relating to at least two different subsets of the power grid, and wherein the generating the overall score for the time interval comprises generating separate overall scores for each of the two subsets of the power grid.

12. The method according to claim 11, further comprising:
receiving location information associated with an EV,
wherein the subset of the power grid for which the overall score is generated corresponds to the location information associated with the EV.

13. The method according to claim 9, wherein the generating overall score comprises generating predicted overall scores for each of a plurality of time intervals in a time horizon.

14. The method according to claim 9, wherein the generating overall score comprises generating context information associated with the overall score, the context information comprising a textual description relating to the overall score, and wherein the providing the control information includes providing the context information.

15. The method according to claim 9, wherein the providing control in relation to operations of one or more EVs comprises triggering, in response to the control information, one or more physical actions relating to EV charging in relation to at least one of the EVs.

16. The method according to claim 9, wherein generating EV charging schedule information comprises scheduling charging of at least one EV to optimize one or more overall scores associated with one or more time periods during which the charging is scheduled to occur, wherein the optimizing seeks the one or more overall scores favoring higher suitability for charging.

17. A non-transitory computer-readable medium having computer-readable instructions stored thereon, the computer-readable instructions executable by at least one processor to cause the performance of operations relating to providing control in relation to operations a plurality of electric vehicles (EVs) associated with a power grid, the operations comprising:
receiving power grid information relating to the power grid, the power grid information including:
power grid load information comprising information relating to load on the power grid;

power grid load prediction information, which includes information relating to predicted power grid load in one or more future time periods;

renewables generation prediction information, which includes information relating to predicted quantities of power generated by renewable power sources in the one or more future time periods;

receiving environmental emissions information relating to a quantity of environmental emissions generated by energy generation sources providing power to the power grid; and providing control in relation to operations of one or more EVs, wherein the providing control comprises:

generating an overall score for a time interval, wherein the time interval comprises at least one of a current time period and the one or more future time periods, based on the power grid information and the environmental emissions information, wherein the overall score indicates a level of suitability for charging an EV during the time interval, wherein higher suitability is associated with a lower quantity of environmental emissions;

generating control information based on the overall score, wherein the control information comprises EV charging schedule information and wherein the EV charging schedule information includes an indication to initiate charging of an EV when the overall score is above a predefined threshold; and providing the control information for use by one or more computing devices associated with the one or more EVs for use in controlling of the one or more EVs.

18. The non-transitory computer-readable medium according to claim 17, wherein the generating the overall score comprises:

generating a power grid subscore based on the power grid information;

generating an environmental subscore based on the environmental emissions information; and generating the overall score based on the power grid subscore and the environmental subscore using an ensemble process.

19. The non-transitory computer-readable medium according to claim 17, wherein at least one of the power grid load information and the power grid load prediction information comprises information relating to at least two different subsets of the power grid, and wherein the generating the overall score for the time interval comprises generating separate overall scores for each of the two subsets of the power grid.

20. The non-transitory computer-readable medium according to claim 17, the operations further comprising:

receiving location information associated with an EV, wherein the subset of the power grid for which the overall score is generated corresponds to the location information associated with the EV.

* * * * *